(12) United States Patent
Mondal

(10) Patent No.: US 10,951,032 B2
(45) Date of Patent: *Mar. 16, 2021

(54) MULTI-LEVEL MEDIUM VOLTAGE DATA CENTER STATIC SYNCHRONOUS COMPENSATOR (DCSTATCOM) FOR ACTIVE AND REACTIVE POWER CONTROL OF DATA CENTERS CONNECTED WITH GRID ENERGY STORAGE AND SMART

(71) Applicant: Inertech IP LLC, Danbury, CT (US)

(72) Inventor: Subrata K. Mondal, South Windsor, CT (US)

(73) Assignee: INERTECH IP LLC, Danbury, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/715,872

(22) Filed: Sep. 26, 2017

(65) Prior Publication Data

US 2018/0269684 A1 Sep. 20, 2018

Related U.S. Application Data

(63) Continuation of application No. 14/481,904, filed on Sep. 9, 2014, now Pat. No. 9,774,190.

(Continued)

(51) Int. Cl.
*H02J 3/32* (2006.01)
*H02J 3/18* (2006.01)
(Continued)

(52) U.S. Cl.
CPC ............. *H02J 3/32* (2013.01); *H02J 3/1857* (2013.01); *H02M 7/483* (2013.01); *H02J 7/345* (2013.01);
(Continued)

(58) Field of Classification Search
CPC ............ H02J 3/32; H02J 3/1857; H02J 7/345; H02M 7/483; H02M 2001/007;
(Continued)

(56) References Cited

U.S. PATENT DOCUMENTS 5,715,693 A 2/1998 van der Walt et al.
6,116,048 A 9/2000 Hebert
(Continued)

FOREIGN PATENT DOCUMENTS

AU 2010256688 A1 1/2012
CN 101442893 A 5/2009
(Continued)

OTHER PUBLICATIONS

Weatherman: Automated, Online, and Predictive Thermal Mapping and Management for Data Centers; 2006; Justin Moore, Jeffrey S. Chase, Parthasarathy Ranganathan.
(Continued)

*Primary Examiner* — Carlos Amaya
(74) *Attorney, Agent, or Firm* — Weber Rosselli & Cannon LLP

(57) ABSTRACT

Systems and methods for supplying power (both active and reactive) at a medium voltage from a DCSTATCOM to an IT load without using a transformer are disclosed. The DCSTATCOM includes an energy storage device, a two-stage DC-DC converter, and a multi-level inverter, each of which are electrically coupled to a common negative bus. The DC-DC converter may include two stages in a bidirectional configuration. One stage of the DC-DC converter uses a flying capacitor topology. The voltages across the capacitors of the flying capacitor topology are balanced and switching losses are minimized by fixed duty cycle operation. The DC-DC converter generates a high DC voltage from a low or high voltage energy storage device such as (Continued)

batteries and/or ultra-capacitors. The multi-level, neutral point, diode-clamped inverter converts the high DC voltage into a medium AC voltage using a space vector pulse width modulation (SVPWM) technique.

18 Claims, 15 Drawing Sheets

Related U.S. Application Data

(60) Provisional application No. 61/875,640, filed on Sep. 9, 2013.

(51) Int. Cl.
    *H02M 7/483* (2007.01)
    *H02J 7/34* (2006.01)
    *H02M 1/00* (2006.01)

(52) U.S. Cl.
    CPC ............ *H02M 2001/007* (2013.01); *H02M 2007/4835* (2013.01); *Y02E 40/16* (2013.01); *Y02E 40/26* (2013.01); *Y02E 70/40* (2013.01); *Y10T 307/344* (2015.04)

(58) Field of Classification Search
    CPC ........ H02M 2007/4835; Y10T 307/344; Y02E 40/16; Y02E 40/26; Y02E 70/40
    USPC ..................................................... 307/23
    See application file for complete search history.

(56) References Cited

U.S. PATENT DOCUMENTS

| | | |
|---|---|---|
| 6,374,627 B1 | 4/2002 | Schumacher et al. |
| 6,574,104 B2 | 6/2003 | Patel et al. |
| 6,640,561 B2 | 11/2003 | Roberto |
| 6,772,604 B2 | 8/2004 | Bash et al. |
| 6,826,922 B2 | 12/2004 | Patel et al. |
| 6,859,366 B2 | 2/2005 | Fink |
| 6,980,433 B2 | 12/2005 | Fink |
| 7,046,514 B2 | 5/2006 | Fink et al. |
| 7,106,590 B2 | 9/2006 | Chu et al. |
| 7,173,820 B2 | 2/2007 | Fink et al. |
| 7,406,839 B2 | 8/2008 | Bean et al. |
| 7,418,825 B1 | 9/2008 | Bean, Jr. |
| 7,477,514 B2 | 1/2009 | Campbell et al. |
| 7,569,954 B2 | 8/2009 | Tolle et al. |
| 7,660,116 B2 | 2/2010 | Claassen et al. |
| 7,660,121 B2 | 2/2010 | Campbell et al. |
| 7,684,193 B2 | 3/2010 | Fink et al. |
| 7,730,731 B1 | 6/2010 | Bash et al. |
| 7,738,251 B2 | 6/2010 | Clidaras et al. |
| 7,804,687 B2 | 9/2010 | Copeland et al. |
| 7,855,890 B2 | 12/2010 | Kashirajima et al. |
| 7,864,527 B1 | 1/2011 | Whitted |
| 7,881,057 B2 | 2/2011 | Fink et al. |
| 7,903,404 B2 | 3/2011 | Tozer et al. |
| 7,903,409 B2 | 3/2011 | Patel et al. |
| 7,907,406 B1 | 3/2011 | Campbell et al. |
| 7,957,144 B2 | 6/2011 | Goettert et al. |
| 7,963,119 B2 | 6/2011 | Campbell et al. |
| 8,000,103 B2 | 8/2011 | Lipp et al. |
| 8,031,468 B2 | 10/2011 | Bean, Jr. et al. |
| 8,118,084 B2 | 2/2012 | Harvey |
| 8,120,916 B2 | 2/2012 | Schmidt et al. |
| 8,146,374 B1 | 4/2012 | Zien |
| 8,184,435 B2 | 5/2012 | Bean, Jr. et al. |
| 8,189,334 B2 | 5/2012 | Campbell et al. |
| 8,199,504 B2 | 6/2012 | Kashirajima et al. |
| 8,208,258 B2 | 6/2012 | Campbell et al. |
| 8,218,322 B2 | 7/2012 | Clidaras et al. |
| 8,261,565 B2 | 9/2012 | Borror et al. |
| 8,289,710 B2 | 10/2012 | Spearing et al. |
| 8,297,069 B2 | 10/2012 | Novotny et al. |
| 8,320,125 B1 | 11/2012 | Hamburgen et al. |
| 8,351,200 B2 | 1/2013 | Arimilli et al. |
| 8,387,687 B2 | 3/2013 | Baer |
| 8,392,035 B2 | 3/2013 | Patel et al. |
| 8,405,977 B2 | 3/2013 | Lin |
| 8,432,690 B2 | 4/2013 | Fink et al. |
| 8,456,840 B1 | 6/2013 | Clidaras et al. |
| 8,457,938 B2 | 6/2013 | Archibald et al. |
| 8,472,182 B2 | 6/2013 | Campbell et al. |
| 8,514,575 B2 | 8/2013 | Goth et al. |
| 8,583,290 B2 | 11/2013 | Campbell et al. |
| 8,689,861 B2 | 4/2014 | Campbell et al. |
| 8,760,863 B2 | 6/2014 | Campbell et al. |
| 8,763,414 B2 | 7/2014 | Carlson et al. |
| 8,780,555 B2 | 7/2014 | Fink et al. |
| 8,783,052 B2 | 7/2014 | Campbell et al. |
| 8,797,740 B2 | 8/2014 | Campbell et al. |
| 8,813,515 B2 | 8/2014 | Campbell et al. |
| 8,817,465 B2 | 8/2014 | Campbell et al. |
| 8,817,474 B2 | 8/2014 | Campbell et al. |
| 8,824,143 B2 | 9/2014 | Campbell et al. |
| 8,839,638 B2 | 9/2014 | Kashirajima et al. |
| 8,867,204 B1 | 10/2014 | Gardner |
| 8,879,257 B2 | 11/2014 | Campbell et al. |
| 9,774,190 B2 * | 9/2017 | Mondal ................. H02J 3/1857 |
| 2002/0172007 A1 | 11/2002 | Pautsch |
| 2003/0061824 A1 | 4/2003 | Marsala |
| 2007/0227710 A1 | 10/2007 | Belady et al. |
| 2008/0062724 A1 | 3/2008 | Feng et al. |
| 2009/0086428 A1 | 4/2009 | Campbell et al. |
| 2009/0154096 A1 | 6/2009 | Iyengar et al. |
| 2010/0032142 A1 | 2/2010 | Copeland et al. |
| 2010/0136895 A1 | 6/2010 | Sgro |
| 2010/0300650 A1 | 12/2010 | Bean, Jr. |
| 2011/0198057 A1 | 8/2011 | Lange et al. |
| 2011/0265983 A1 | 11/2011 | Pedersen |
| 2011/0280055 A1 | 11/2011 | Nielsen |
| 2011/0313576 A1 | 12/2011 | Nicewonger |
| 2012/0012283 A1 | 1/2012 | Bean, Jr. et al. |
| 2012/0103591 A1 | 5/2012 | Tozer |
| 2012/0174612 A1 | 7/2012 | Madara et al. |

FOREIGN PATENT DOCUMENTS

| | | |
|---|---|---|
| CN | 100584168 C | 1/2010 |
| CN | 101686629 A | 3/2010 |
| CN | 102334396 A | 1/2012 |
| CN | 102461357 A | 5/2012 |
| DE | 102012218873 A1 | 5/2013 |
| EP | 1604263 A2 | 12/2005 |
| JP | 2008287733 A | 11/2008 |
| JP | 5113203 B2 | 1/2013 |
| JP | 5209854 B2 | 6/2013 |
| JP | 5243929 B2 | 7/2013 |
| JP | 5244058 B2 | 7/2013 |
| JP | 5301009 B2 | 9/2013 |
| JP | 5308750 B2 | 10/2013 |

OTHER PUBLICATIONS

Reduced-Order Modeling of Multiscale Turbulent Convection: Application to Data Center Thermal Management; May 2006; Jeffrey D. Rambo.
HP Modular Cooling System Site Preparation Guide; 2006-2007.
"Air-Cooled High-Performance Data Centers: Case Studies and Best Methods"; 2006; White Paper; Intel Information Technology.
Data Center Evolution; 2009; A Tutorial on State of the Art, Issues, and Challenges.

* cited by examiner

| ∂: Angle between Inv. and Grid Voltage | | Grid Voltage | Statcom Inv. Voltage | Active Power Flow | Reactive Power Flow | Comments | |
|---|---|---|---|---|---|---|---|
| ∂ (deg) | ∂ (rad) | $V_{GRID}$ | $V_{INV}$ | P | Q | | |
| -30 | -0.52 | 1 | 0.75 | -1.13 | -0.75 | Absorbs reactive VAR (Q) from grid | Absorbs real power (P) from grid and battery is charged |
| -45 | -0.79 | 1 | 1 | -2.12 | 0 | Reactive power (Q) exchange is zero | |
| -60 | -1.05 | 1 | 1.25 | -3.25 | 0.75 | Provides capacitive VAR (Q) to grid | $V_{Inv}$ lags $V_{Grid}$ by ∂ |
| 0 | 0 | 1 | 0.75 | 0 | -0.75 | Absorbs reactive VAR (Q) from grid | |
| 0 | 0 | 1 | 1 | 0 | 0 | Reactive power (Q) exchange is zero | Real power (P) exchange is zero |
| 0 | 0 | 1 | 1.25 | 0 | 0.75 | Provides capacitive VAR (Q) to grid | $V_{Inv}$ and $V_{Grid}$ '∂' is zero |
| 30 | 0.52 | 1 | 0.75 | 1.13 | -0.75 | Absorbs reactive VAR (Q) from grid | Provides real power (P) to grid and battery is discharged |
| 45 | 0.79 | 1 | 1 | 2.12 | 0 | Reactive power (Q) exchange is zero | |
| 60 | 1.05 | 1 | 1.25 | 3.25 | 0.75 | Provides capacitive VAR (Q) to grid | $V_{Inv}$ leads $V_{Grid}$ by ∂ |

FIG. 14

| PF | Grid kW | Grid kVA | Grid kVAR | PUE | Elec Loss kW | Mech Loss kW | IT Load kW | Data Center OPEX Demand Penalty/yr ($) | *CAPEX Freeing up DC Capacity (%) | OPEX Electrical Loss Savings/yr ($) | Total OPEX Savings/yr ($) | Comments |
|---|---|---|---|---|---|---|---|---|---|---|---|---|
| 0.85 | 1500 | 1764.7 | 929.6 | 1.5 | 150 | 350 | 1000 | 16733.10 | 0 | 0 | 0 | Existing DC, Demand penalty as no STATCOM (Topology I), Data Center (DC) with MVUPS |
| 1 | 1500 | 1500 | 0 | 1.5 | 150 | 350 | 1000 | 0 | 0 | 0 | 16733.10 | Regular Reactive power STATCOM (Topology II), No Demand penalty, grid supply is most efficient, DC with MVUPS |
| 1 | 1447.5 | 1447.5 | 0 | 1.448 | 97.5 | 350 | 1000 | 0 | 0 | 55188.00 | 71921.10 | DCSTATCOM at up stream (Topology III) of service entrance. Both Active+Reactive power. No Demand penalty. No MVUPS hence no UPS loss (3.5%). |
| 1 | 1425 | 1425 | 0 | 1.425 | 75 | 350 | 1000 | 0 | 19.25 | 78840.00 | 95573.10 | DCSTATCOM at down stream (Topology IV) of DC. No Demand penalty. No DC MVUPS hence no UPS loss (3.5%). Also, savings in I²R loss (1.5%). Freeing up DC capacity by 19.25% (Have N+1 DCSTATCOM capacity; not shown in 1-line). |
| | | | | | | | | | $1.386 million | | | |

* Data Center infrastructure (Generator, Transformer, Gear, Cable, Real estate etc.) built cost is around $12 million/MW (Elect. 60% and Mech 40%).

Transformer, Generator, Cable, Real estate is already rated for 1764.7 kVA;

With DCSTATCOM, it requires only 1425 kVA for same 1 MW IT load

So, it frees up 19.25% DC capacity which is equivalent to ($12 million x 0.6 x 19.25% =) $1.386 million in CAPEX savings besides all the OPEX savings Electricity rate = 12cents/kWhr Demand penalty = $1.5/kVAR each month

FIG. 15

MULTI-LEVEL MEDIUM VOLTAGE DATA CENTER STATIC SYNCHRONOUS COMPENSATOR (DCSTATCOM) FOR ACTIVE AND REACTIVE POWER CONTROL OF DATA CENTERS CONNECTED WITH GRID ENERGY STORAGE AND SMART

BACKGROUND

1. Technical Field

The present disclosure generally relates to data center static synchronous compensators (DCSTATCOM) that are connected to a utility power grid at a point of common coupling (PCC) with data center load. More particularly, the present disclosure relates to compact multi-level medium voltage DCSTATCOMs that enable independent active (to provide uninterruptible power supply (UPS), grid energy storage, peak demand supply, Frequency support, power quality operations) and reactive power control (to provide PF corrector, grid voltage stiffness voltage support, grid voltage transient stabilizer operations) for data center loads that are connected to distributed energy sources (both regular and green). DCSTATCOM provides one innovative solution by integrating multiple functions as mentioned. It leverages same capital investment ($/kW cost of DCSTATCOM and MVUPS are in similar range) and generates better cost-benefit ratio incorporating multiple usages.

2. Background of Related Art

There is a large demand for storing digital data in data centers due to the emergence of Web-2.0-enabled businesses in the financial, e-commerce, pharmaceutical, and multimedia industries. The digital storage market doubles every 18 months, which translates to an annual growth rate of approximately 150% for the next 5 years.

Many data centers are equipped with on-site distributed power sources like fuel cells, solar, wind, geothermal, etc. for reliable power. These sources cause several specific problems including two-way power flow and two-way economic relationships. Balancing energy generation and consumption amidst a set of on-site distributed energy sources demands a significant balancing act. The availability and interconnection of multiple energy sources (grid and distributed) requires dynamic voltage regulation at the point of common coupling (PCC) to balance available supplies and load.

For reliable mission critical data centers, UPS is an integral part of data center design. The UPS and energy storage costs for such data centers are high and around $400/kW. Also, UPS is utilized less than 50% in Tier III and Tier IV data centers due to redundant design. To improve the overall Power Factor (PF) of the data center load at PCC to avoid the OPEX PF penalty charge and to reduce the CAPEX data center cost by eliminating UPS is achieved by connecting STATCOM at PCC. Also, by eliminating the UPS from the data center, data center design becomes very flexible because data center IT loads can be added or removed easily because they are not directly connected to the UPS. The active power of STATCOM acts as data center UPS at MV PCC. Also, this energy storage can act as grid energy storage when connected to distributed energy sources like Solar, Wind or FC.

FIG. 1 shows a system 100 with MV UPS and no STATCOM at PCC for supplying power to information technology (IT) and/or mechanical load 155 according to the prior art. The system 100 includes a utility/generator power supply system 195 and a UPS 115 that includes a step-up transformer 140. Under normal load conditions, power is supplied to the load 155 entirely by the utility supply 165. The utility supply 165 supplies an AC voltage ranging from about 3.3 kV to about 13.8 kV. The mechanical portion of the load 155 includes electrical power required to operate cooling equipment required to remove waste heat generated by the IT portion of the load 155.

A surge protector 180 is used to limit voltage spikes in the power supplied by the utility supply 165. A bypass line 162 allows maintenance tasks or other work to be performed on system 171-173 when ON/OFF switch of bypass line 162 (not shown) is closed and a static transfer switch (STS) 175 is opened. Line filters 170 are coupled to each AC line 171, 172, and 173 to reduce harmonics in the power supplied by the generator 160 or the utility supply 165. The STS 175 supplies power to a step-down transformer 150 when the STS 175 is closed. The step-down transformer 150 can convert the medium voltage supplied by the utility supply 165, e.g., 13.8 kV, to a low voltage, e.g., 400 V. The low voltage is then supplied to the load 155 having an appropriate current level.

When an interruption or disturbance in the power supplied by the utility supply 165 is detected, the STS 175 opens and the UPS system 115 starts supplying about 100% of the power to the load 155 via the UPS's step-up transformer 140. The UPS system 115 can supply power to the load 155 for a short period, e.g., approximately five minutes, but generally the generator 160 starts generating power if the interruption is more than a few seconds.

The UPS system 115 generates power from a low-voltage energy storage device 105, e.g., one or more low density lead-acid batteries B. The low voltage $V_B$ of the energy storage device 105 can range from about 300 V to about 600 V. The low voltage is then converted to a high voltage, e.g., approximately 700 V, by a bidirectional DC-DC converter 110. The bidirectional one-stage DC-DC converter 110 converts the low voltage DC to a high voltage DC. The high voltage DC is then converted to a low three-phase AC voltage, e.g., approximately 400 V, using a two-level inverter 120.

The AC voltage output from the two-level inverter 120 passes through filter 130, such as an inductor-capacitor (LC) filter, to a step-up transformer 140. The step-up transformer 140 converts the low AC voltage to a medium AC voltage, e.g., about 13.8 kV. The medium AC voltage output from the step-up transformer 140 is then provided to the step-down transformer 150, which converts the medium AC voltage to a low AC voltage, e.g., about 400 V, that is appropriate for the load 155.

Once the generator 160 has reached its reference speed and stabilized, transfer switch 190 shifts the primary power source from the utility supply 165 to the generator 160. During this shift, the output voltage of the UPS system 115 is synchronized to be in phase with the output voltage of the generator 160. Once the STS 175 is closed, a soft transfer from the UPS system 115 to the generator 160 is executed until the load 155 is entirely powered by the generator 160. The energy storage device 105 of the UPS system 115 is then recharged by the power generated by the generator 160.

After the power interruption or disturbance ends, the load 155 is shifted from the generator 160 to the UPS system 115 because the utility supply 165 may be out of phase with the generator 160 and the STS 175 shifts the primary power source to the utility supply 165. The output voltage of the UPS system 115 is then synchronized to be in phase with the output voltage of the utility supply 165. Once the output voltage of the UPS system 115 and utility supply 165 are synchronized, the load 155 is quickly transferred from the UPS system 115 to the utility supply 165. Then, the energy storage devices 105, e.g., batteries B, of the UPS system 115 are recharged from the utility supply 165 so that the UPS system 115 is ready for future interruptions or disturbances in the utility supply 165.

The step-up transformer 140 in the UPS system 115 meets the power requirements of the load 155; however, the step-up transformer 140 is a large and bulky component of the UPS system 115. As a result, the overall power density of the UPS system 115 is lower because the transformer 140 occupies a large amount of floor space, which, in some cities, can be quite expensive. The transformer 140 also introduces considerable losses (approximately 1 to 1.5% of the power) into the system thereby reducing the efficiency of the UPS system 115. Also, when the traditional sinusoidal pulse width modulation (PWM) technique is used to operate the inverters and an ON-OFF PWM technique for bi-directional single stage DC-DC converters 110 is used, current distortion increases. As a result, LC filters 130, which are expensive and bulky, are placed at the output of the two-level inverters 120 to reduce the current distortion or harmonics as demanded by the IT and/or mechanical load 155.

Alternately, a STATCOM (Static Synchronous Compensator) with step-up transformer (FIG. 2) is connected at PCC but it provides only reactive power compensation and therefore can provide only PF corrector operation at PCC and avoids PF penalty charge of the data center load. The data center still needs MV UPS to provide active power compensation in case of utility power disturbance to the IT load.

STATCOM is a member of the family of FACTS (Flexible AC Transmission System) controllers. FIG. 2 illustrates the application of an existing STATCOM at PCC along with MV UPS. Reactive STATCOM at PCC to an existing data center is used to compensate for reactive power. STATCOM is a shunt connected Voltage Source Inverter (VSI) and is connected to the grid through a smoothing reactor. It is to be noted that existing STATCOMs generate low voltage AC output through a two-level inverter. Therefore, it requires a step-up transformer at its output to match a utility voltage value (for example, 13.8 kV). However, the output step-up transformer is bulky, occupies extra space, and is inefficient. STATCOM, without an output transformer, has a small footprint as it replaces the transformer with a compact power electronic voltage converter. It significantly improves transient stability and regulates dynamic voltage at PCC (Point of common coupling). It also regulates both lag and lead reactive power. Therefore, STATCOM provides a stable voltage for a weak grid along with continuous reactive power regulation.

FIG. 2 illustrates a utility power feed 20' supplied across a utility-load interface 5' defining a utility side 51' and a load side 52' where load 55' is a data center load as mentioned above. The utility power feed 20' is electrically coupled to the data center load 55'. To compensate for reactive power losses caused by the reactive nature of the load 55', a low voltage STATCOM 60 is coupled to the utility power feed 20' at a point of common coupling 72 on the utility side 51' via step-up transformer 68. STATCOM 60 includes a two-level DC-AC inverter 62. The two-level DC-AC inverter 62 is supplied power by a low voltage capacitor 64. The value of the capacitor 64 is small as it provides only reactive power compensation. The AC output of the two-level DC-AC inverter 62 is connected to a smoothing reactor 66 and is then supplied to a step-up transformer 68 whose AC output 70 is electrically coupled to the utility power feed 20' at the point of common coupling 72 on the utility side 51' of the utility-load interface boundary 5'.

SUMMARY

The systems and methods of the present disclosure provide both active and reactive power compensation to a data center IT load using a medium voltage Static Compensator (DCSTATCOM). The DCSTATCOM includes an energy storage device, a two-stage DC-DC multi-level converter and a multi-level inverter outputting a medium AC voltage. The DC-DC converter is a two-stage multi-level DC-DC converter that is configured for bidirectional power flow. The DC-DC converter generates a high DC voltage from a low or medium voltage energy storage device such as a battery and/or ultra capacitor. The multi-level inverter converts the high DC voltage into a medium AC voltage (from about 3.3 kV to 35 kV, e.g., about 13.8 kV). The DCSTATCOM also include a smoothing reactor at the output of the inverter. In one aspect, the present disclosure relates to a transformerless MV STATCOM for an electrical and mechanical data center load. A negative terminal of the energy storage device, a negative terminal of the two-stage DC-DC converter, and a negative terminal of the multi-level inverter are electrically coupled to a common negative bus. The medium AC voltage may be between about 3.3 kV and about 35 kV.

The two-stage DC-DC converter may include a first stage that generates a first output DC voltage and a second stage that generates a second output DC voltage higher than the first output DC voltage. A positive terminal of the second stage of the DC-DC converter and a positive terminal of the multi-level inverter may be electrically coupled to a common positive bus. The first stage may include two levels and the second stage may include more than two inverter levels. The second stage may include three levels or five levels.

The two-stage DC-DC converter may include a plurality of switches that form the levels of the first and second stages and a plurality of capacitors coupled together in a flying capacitor multi-level topology having a common negative bus. The medium AC output may be a three-phase AC output, the multi-level inverter may include three sets of switches, each of which corresponds to one of the three phases of the three-phase AC output, and each set of switches may be configured in a diode-clamped multi-level topology.

The multi-level inverter may convert the second output DC voltage into a third output voltage that is an AC voltage smaller than the second output DC voltage. The multi-level inverter may include more than two levels. The DCSTATCOM includes a smoothing reactor at the output of the inverter.

The DCSTATCOM may further include a DC-DC converter controller and a multi-level inverter controller. The DC-DC converter controller controls the first stage with pulse width modulation control signals and controls the second stage in a flying mode configuration with fixed duty cycle control signals. The multi-level inverter controller controls the multi-level inverter using space vector PWM control signals so as to perform neutral point voltage balancing.

The two-stage DC-DC converter may be a bidirectional converter that allows the flow of power in a first direction from the energy storage device to the AC output of the multi-level inverter and in a second direction from the AC output of the multi-level inverter to the energy storage device.

The energy storage device may be a low voltage energy storage device. The low voltage may be between about 700 V and about 1200 V. The energy storage device may be a battery, an ultra-capacitor, or a battery and an ultra-capacitor electrically coupled to one another.

In yet another aspect, the present disclosure features a method for supplying active power from an energy storage device of transformerless DCSTATCOM to an electrical/mechanical data center load when an interruption in utility power occurs. The method includes supplying a first DC voltage from a low voltage energy storage device to a DC-DC converter, converting the first DC voltage into a second DC voltage, providing the second DC voltage to a multi-level inverter, and generating an AC voltage from the second DC voltage.

In yet another aspect, the present disclosure features a method for absorbing active power from data center load with energy sources to an energy storage device of transformerless DCSTATCOM when excess power is available at PCC.

In yet another aspect, the present disclosure features a method for supplying or absorbing reactive power from a transformer-less DCSTATCOM at PCC of data center.

BRIEF DESCRIPTION OF THE DRAWINGS

Various embodiments of the present disclosure are described with reference to the accompanying drawings wherein:

FIG. 14 is a table showing various operating conditions of DCSTATCOM; and FIG. 15 is a table showing cost savings per year and corresponding freeing up of data center capacity for four different cases.

DETAILED DESCRIPTION

Figure 1:
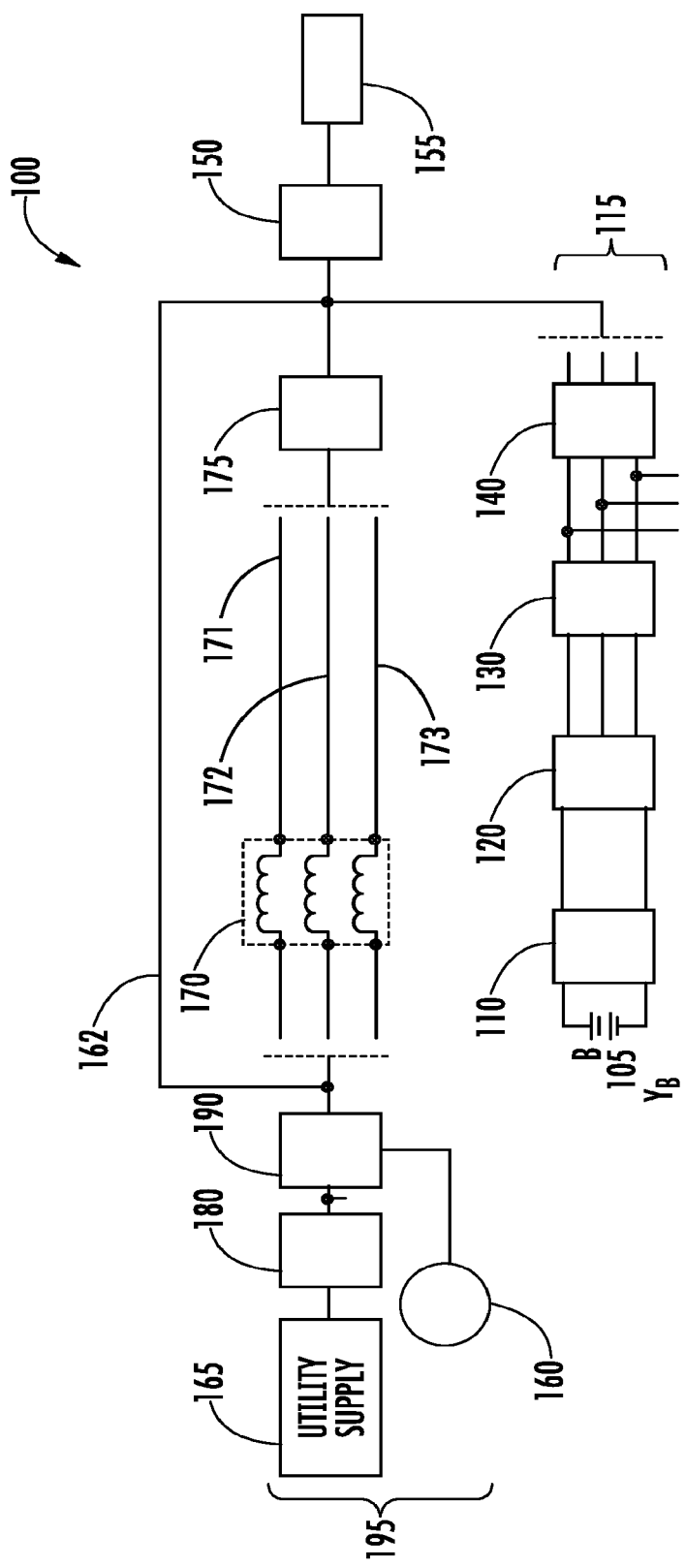
FIG. 1 is a schematic block diagram including 'medium voltage UPS utilizing step-up transformer' of a power supply system for a data center according to the prior art.

Embodiments of the present disclosure are described in detail with reference to the drawing figures wherein like reference numerals identify similar or identical elements.

The present disclosure relates to multi-level, transformerless DCSTATCOM system that includes a multi-level DC-DC converter and a multi-level inverter coupled together. The efficiency of a conventional STATCOM using a transformer is about 96%. In contrast, the transformer-less DCSTATCOM according to present disclosure can achieve efficiencies of about 97%.

Figure 3:
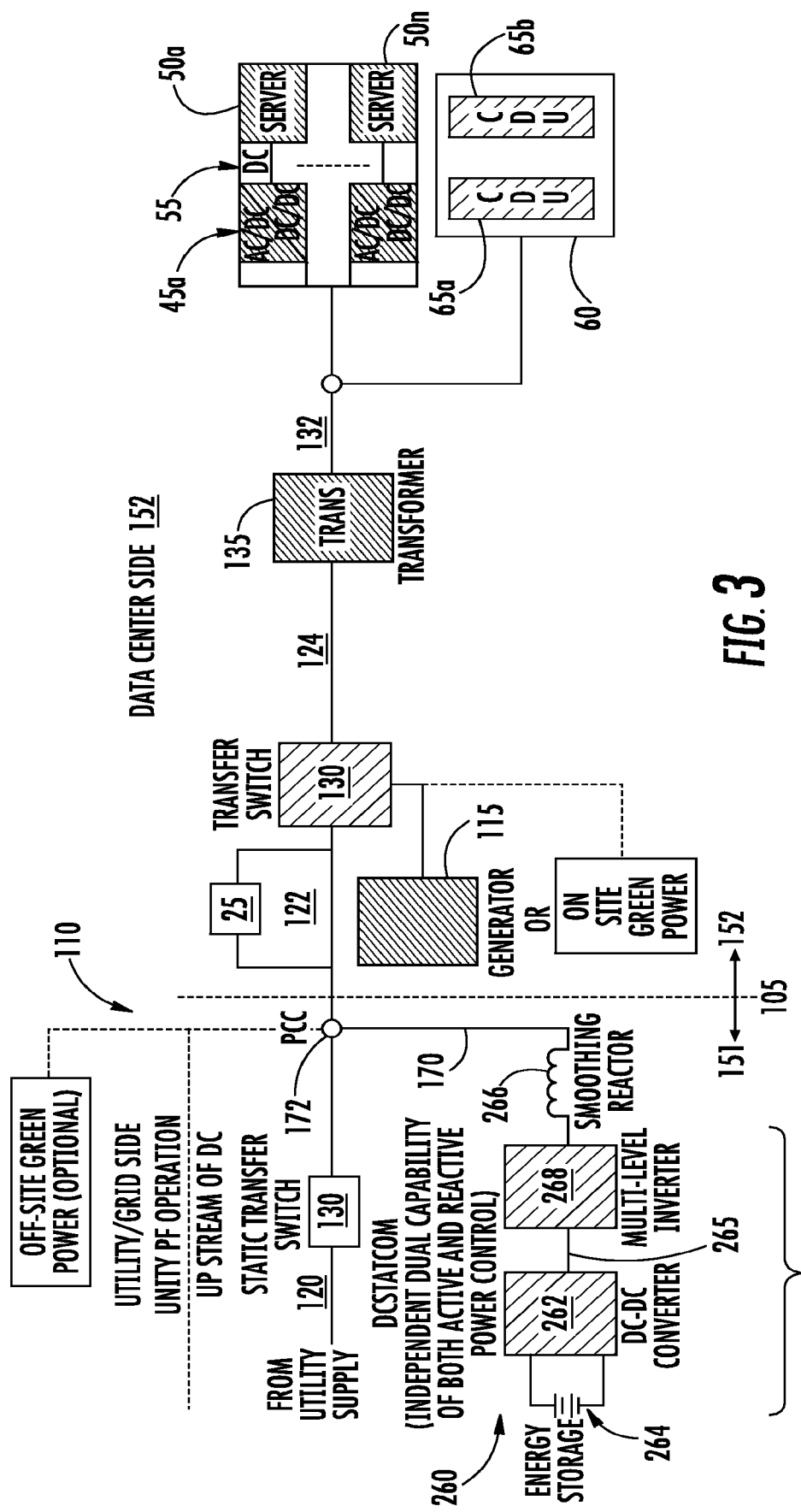
FIG. 3 is a schematic block diagram including a multi-level DCSTATCOM without any output transformer with both simultaneous active and reactive power control capability connected at upstream PCC of a data center according to embodiments of the present disclosure.

STATCOM (Static Synchronous Compensator), which is a family of FACTS (Flexible AC Transmission System) controllers, is a shunt connected voltage source inverter and is connected to the grid through a smoothing reactor, as shown in FIG. 3.

Existing STATCOM generates low voltage AC output through a two-level inverter. Therefore, it requires a transformer at its output to match the utility voltage value (for example, 13.8 kV).

Figure 2:
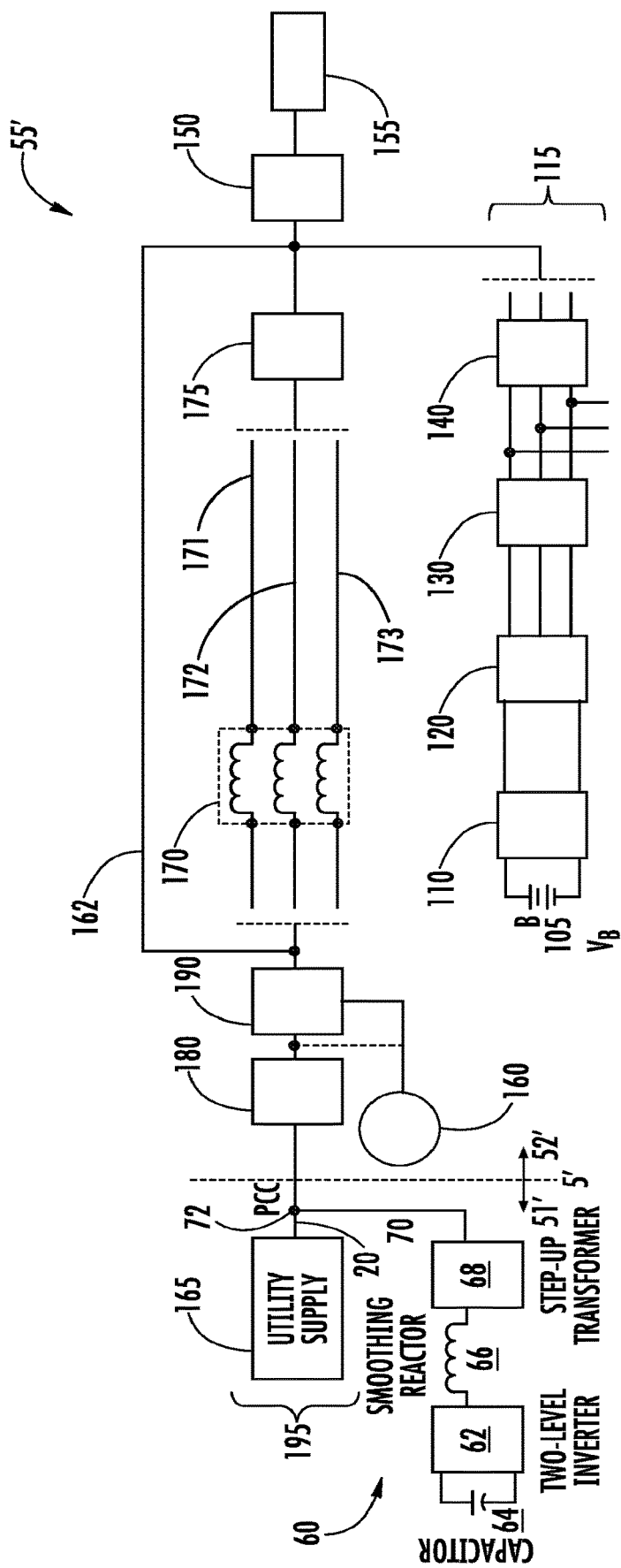
FIG. 2 is a schematic block diagram including 'medium voltage UPS utilizing step-up transformer' and STATCOM with reactive power control of a power supply system for a data center according to the prior art.

In this application, active energy storage is not possible for the STATCOM 60 (FIG. 2). The STATCOM 60 is not suitable to function as a UPS or to store energy from the utility power feed 20' supplied from the utility grid (not shown). Only reactive power compensation is possible. The step-up transformer 68 that is required at the output of the smoothing reactor 66 is a large, bulky device which requires extra space and imposes additional weight and cost in addition to incurring power losses.

FIG. 3 illustrates a DCSTATCOM applied to a utility power feed of a data center to control both active (to provide uninterruptible power supply (UPS), grid energy storage, peak demand supply operations) and reactive power (to provide PF corrector, grid voltage stiffness, grid voltage transient stabilizer operations) according to one embodiment of the present disclosure. More particularly, new or existing data center 110 has a utility-data center boundary interface 105 defining a utility side 151 and a data center side 152. On the utility side 151, a utility power feed 120 supplies, on data center side 152, power to double conversion AC-DC/DC-DC server power supplies 45a'-45n' with an AC input and a DC output. AC output from the step-down transformer 135 is supplied via AC feed line 124 to IT loads 55 and mechanical loads 60 via 132. A generator 115 on the data center side 152, which connects to transfer switch 130, starts to operate once a disturbance in the utility power feed 120, e.g., a loss of all or a portion of the electricity provided by the utility power feed 120, is more than approximately two seconds. During a disturbance in the utility feed 124, a surge protector 25 dampens the disturbance. For disturbances beyond a predetermined acceptable level that are beyond the dampening capabilities of the surge protector 25 or during a utility black out condition, the IT loads 55 and mechanical loads 60 are now powered by a medium voltage DCSTATCOM 260 located on the utility side 151 of the utility-data center interface boundary 105.

Medium voltage DCSTATCOM 260 is electrically coupled to the utility power feed 120 at a point of common coupling 172 on the utility side 151. In contrast to STAT- COM 60 of FIG. 2, DCSTATCOM 260 includes a DC-DC converter 262 whose DC output 265 is electrically coupled as input to a multi-level inverter 268. The DC-DC converter 262 is supplied power via an energy storage device 264. The AC output of the multi-level inverter is electrically coupled to the PCC 172 through a smoothing reactor or inductor 266 in feed line 170 that electrically couples the smoothing reactor 266 to the utility power feed line 120 at PCC 172, which, in turn, supplies AC power to the transfer switch 130. When an interruption or disturbance in the power supplied by the utility supply 120 is detected, the STS 130 opens and the DCSTATCOM system 260 starts supplying about 100% of the total power to the loads 55 and 60. The DCSTATCOM system 260 can supply power to the loads 55 and 60 for a short period, e.g., approximately five minutes, but generally the generator 115 or on-site green power starts generating power if the interruption is more than a few seconds. It reduces data center CAPEX/OPEX cost as there is no UPS in the data center and there are no corresponding UPS losses that reduce PUE of the data center.

DCSTATCOM also provides reactive power at PCC to maintain a unity power factor of the devices upstream from the PCC. This reactive power compensation avoids a penalty bill from the utility and reduces utility component (transformer, cable (not shown)) heat loss by 1.4% at 0.85 PF. It also frees up 19.25% capacity of utility components (transformer, cable) at 0.85 PF. The IT server loads 55 are supplied power via double conversion AC-DC/DC-DC power supplies 45a'-45n'.

Figure 4:
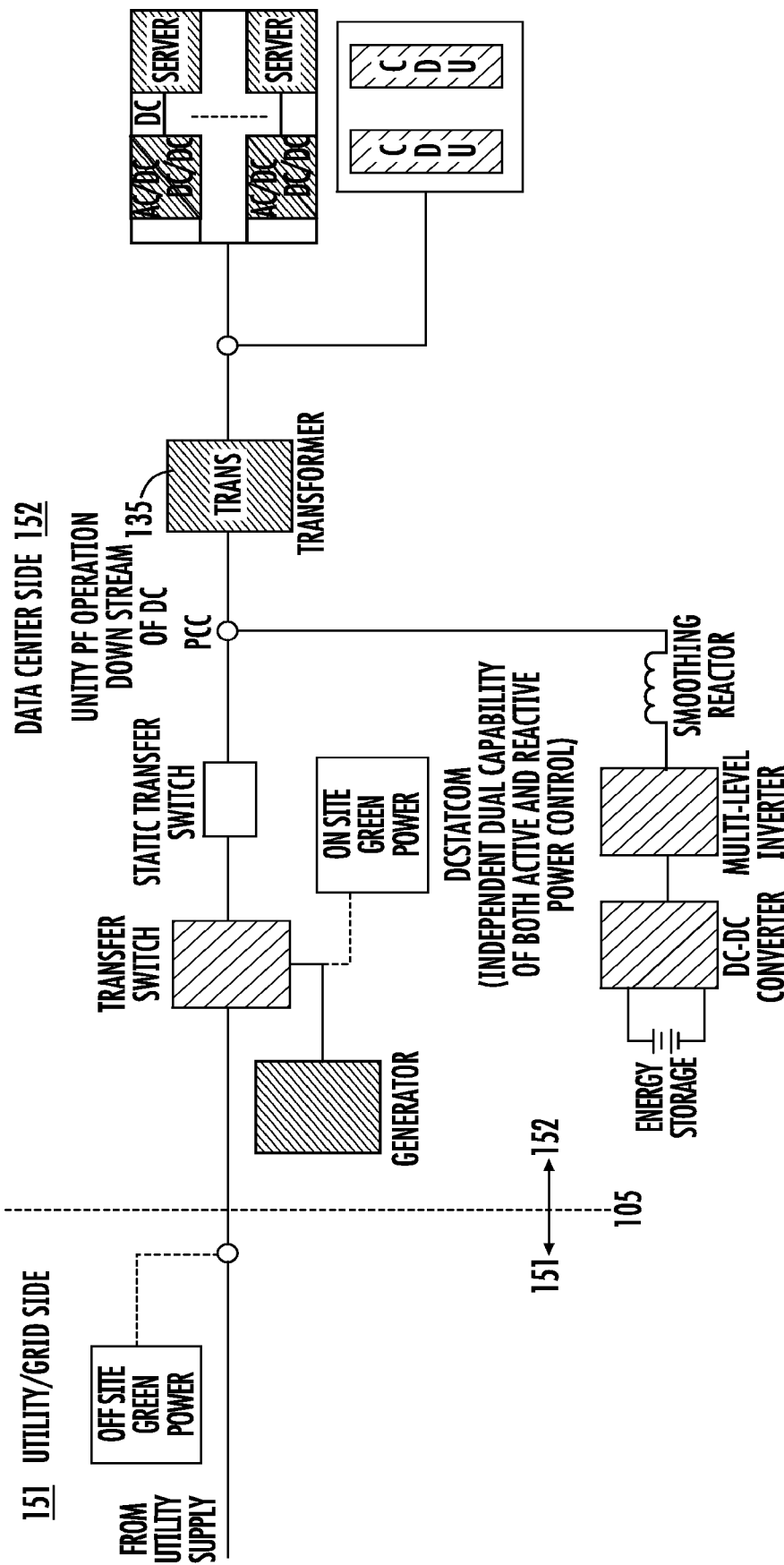
FIG. 4 is a schematic block diagram including a multi-level DCSTATCOM without any output transformer with both simultaneous active and reactive power control capability connected at downstream PCC of a data center according to embodiments of the present disclosure.

FIG. 4 illustrates a DCSTATCOM connected at downstream of data center (up to and including the static transfer switch) to control both active (to provide uninterruptible power supply (UPS), grid energy storage, peak demand supply operations) and reactive power (to provide PF corrector, grid voltage stiffness, grid voltage transient stabilizer operations).

DCSTATCOM also provides reactive power at PCC to maintain a unity power factor of the devices at the utility upstream (FIG. 3) and downstream (FIG. 4) of the data center. This reactive power compensation avoids a penalty bill from the utility and may reduce heat losses in utility components (transformer, cable (not shown)), generator, transfer switch, and static transfer switch by 1.4% at 0.85 PF. It also frees up about 20% capacity of the utility components (transformer, cable), generator, transfer switch, and static transfer switch of the data center at 0.85 PF.

Figure 5:
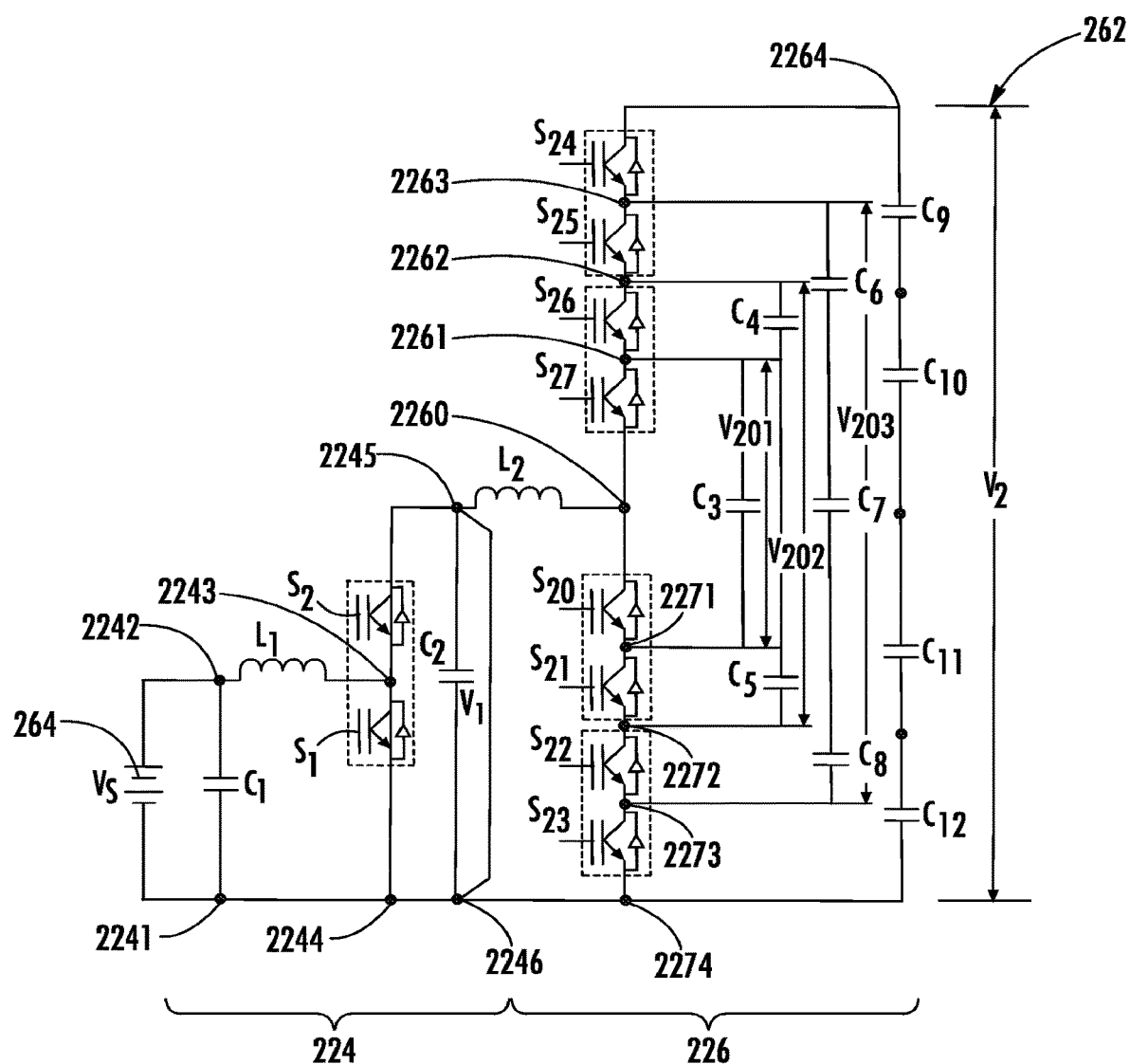
FIG. 5 is a circuit diagram of an embodiment of a multi-level two-stage bidirectional DC-DC converter of the DCSTATCOM of FIG. 3 or 4.

FIG. 5 depicts DC-DC converter 262, described above with respect to FIG. 3 (262), which is a bi-directional two-stage DC-DC converter 224, 226. The first DC-DC stage 224 converts the voltage from the energy storage device 264 into voltage V1. Voltage V1 is a DC voltage higher than the voltage of the energy storage device 264. The second DC-DC stage 226 converts the voltage V1 into voltage V2, which is higher than voltage V1. The voltage boost from the first and second stages 224, 226 can range from about 1:5 to about 1:10. The voltage boost of the DC-DC converter 262 can be adjusted by changing the size of the switches at each level, the number of stages, and/or the number of levels in each stage. The optimum boost voltage requirement is based on the given voltage of the energy storage device 264 and the required voltage output from the inverter 268. For lower voltage outputs from the inverter 268 the boost voltage ratio can be lower. For higher voltage outputs from the inverter 268 the boost voltage ratio can be higher. The efficiency of the DC-DC converter 224 is reduced when the boost ratio is greater than about 7.

In FIG. 5, output capacitor C2 and inductor L2 connect the first stage 224 to the second stage 226. More particularly, inductor L2 is connected from a positive junction 2245 to a positive junction 2260, which forms a common positive junction for the second stage 226.

The first stage 224 of the DC-DC converter 262 is shown as a bidirectional, two-level DC-DC converter having one insulated gate bipolar transistor (IGBT) switch S1 connected in series with another IGBT switch S2. The switches S1 and S2 are connected to the energy storage device 264 through an LC filter, which includes capacitor C1 and inductor L1. Capacitor C1 is connected in parallel across the terminals of energy storage device 264 from junction 2241 on the negative terminal to junction 2242 on the positive terminal. Inductor L1 is connected from the positive junction 2242 to the collector terminal of switch S1 at junction 2243.

The switch S1 is connected from the positive junction 2243 to junction 2244 on the negative terminal side of energy storage device 264, which is at an equipotential with junction 2241. Capacitor C2 is connected from positive junction 2245 to negative junction 2246 with is at an equipotential with junctions 2241 and 2244. Voltage V1 is the potential difference between junction 2245 and junction 2246 across capacitor C2. Thus, switch S2 and capacitor C2 are connected in series with respect to the energy storage device 264.

If the switch S1 is formed into a boost converter, the first stage 224 may provide a range of duty or boost ratios. For example, as shown in Table 1 below, the boost ratio may range from 0 to 0.9. Thus, if the input voltage (VS) to the first stage 224 is about 1 kV, the output voltage (V1) ranges from 1 kV to 10 kV depending on the value of the boost ratio, as shown in Table 1. The voltage V1 varies depending upon the inductance of L1 multiplied by the rate of change of current di/dt. As used herein, voltage V1 refers to the voltage output of the first stage of a DC-DC converter. Also, as used herein, voltage V2 refers to the output voltage of the final stage of a DC-DC converter.

TABLE 1

| VS (~1 kV) | Duty (Boost) ratio | V1 |
| --- | --- | --- |
| 1 kV | 0 | 1 kV |
| 1 kV | 0.2 | 1.25 kV |
| 1 kV | 0.4 | 1.66 kV |
| 1 kV | 0.6 | 2.5 kV |
| 1 kV | 0.7 | 3.3 kV |
| 1 kV | 0.8 | 5 kV |
| 1 kV | 0.9 | 10 kV |

The IGBT in switch S1 may be configured in such a way as to handle a lower voltage and a higher current. Furthermore, because the IGBT of switch S1 is handling a lower voltage, the overall size of the IGBT may be smaller.

FIG. 5 shows an embodiment of the DC-DC converter 262 of FIG. 3, which is a two-stage, bidirectional DC-DC converter. The two-stage bidirectional DC-DC converter 262 can be used to supply power from the energy storage device 264 to the load 152 when power from the generator 115 or utility supply 120 is interrupted or to charge the energy storage device 264 with power from the utility supply 120 when the utility supply 120 is supplying power to the data center load 152.

The two-stage bidirectional DC-DC converter 262 is a bi-directional converter 262 of FIG. 3. Switches S1 and S20-S23 are used to supply power (discharging of energy storage 264) to the load 155 and switches S2 and S24-S27 are used to charge the energy storage device 264. In particular, switch S1 is configured as a boost converter that converts the voltage Vs of the energy storage device 264 to a higher voltage and switch S2 is configured as a buck converter that converts voltage from the utility supply 120 to a lower voltage appropriate for charging the energy storage device 264, e.g., a voltage slightly more than Vs.

Voltage V201 is measured across switches S20 and S27 and capacitor C3 from junction 2261 to junction 2271. Voltage V202 is measured across switches S21 and S26 and capacitors C4 and C5 from junction 2262 to junction 2272. Voltage V203 is measured across switches S22 and S25 and capacitors C6, C7, and C8 from junction 2263 to junction 2273. Voltage V2 is then measured across switches S23 and S24 and capacitors C9, C10, C11, and C12 from junction 2264 to junction 2274.

Each of the switches S20-S27 outputs a voltage equal to the input voltage V1. Thus, the capacitance of capacitor C9 equals the capacitance of capacitor C2, the capacitance of capacitor C10 equals the capacitance of capacitor C2, the capacitance of capacitor C11 equals the capacitance of capacitor C2, and the capacitance of capacitor C12 equals the capacitance of capacitor C2. Since the switches S20-S27 are connected in series, the output voltage V2 is equal to the sum of the voltages output from each of the switches S20-S27. Thus, the boost ratio is 4:1 and V2 equals 4×V1.

The capacitors C3-C12 are relatively small capacitors, e.g., capacitors rated for about 5 kV with a capacitance value that is about ten times less than a capacitor for a conventional DC-DC converter. For example, if a conventional two-level DC-DC converter needs a capacitor having a value of about 2000 μF, then the multi-level flying capacitor arrangement (e.g., C3-C12) needs a capacitor having a value of about 200 μF. In a five-level arrangement, each switch S20-S23 operates at a fixed duty cycle of 25% and a fixed switching frequency without pulse width modulation. The voltages V201, V202, V203, and V2 across the capacitors C3-C12 may be balanced in every switching cycle due to fixed duty cycle operation. Additionally, the voltage across each switch S20-S23 maintains 25% of the high voltage V2.

For a conventional one-stage DC-DC converter, the boost ratio is about 1:18 to about 1:24 for lower energy storage voltages, e.g., 1 kV. The efficiency of a DC-DC converter is reduced when the high boost conversion ratio is greater than about 7. For the two-stage DC-DC converter 220, 230, or 234, the boost ratio of each stage is about 1:4 to about 1:6. In the case of the DC-DC converter 262 of FIG. 5, the voltage of the energy storage device is high (e.g., about 4 kV to about 6 kV), which reduces the boost conversion ratio to around 5 to 7. This improves the efficiency of the DC-DC converter 262.

As shown in FIG. 5, the number of capacitors coupled in series between the collectors of switches arranged in the upper portion of a stage and the emitters of the switches arranged in the lower portion of the stage depends on the level of the switch to which the capacitors are coupled. The DC-DC converter 262, however, may include any number of capacitors coupled in series between the collectors and emitters of appropriate switches to achieve a desired result. The DC-DC converter 262 of FIG. 5 is a five-level converter in flying capacitor configuration.

Figure 6:
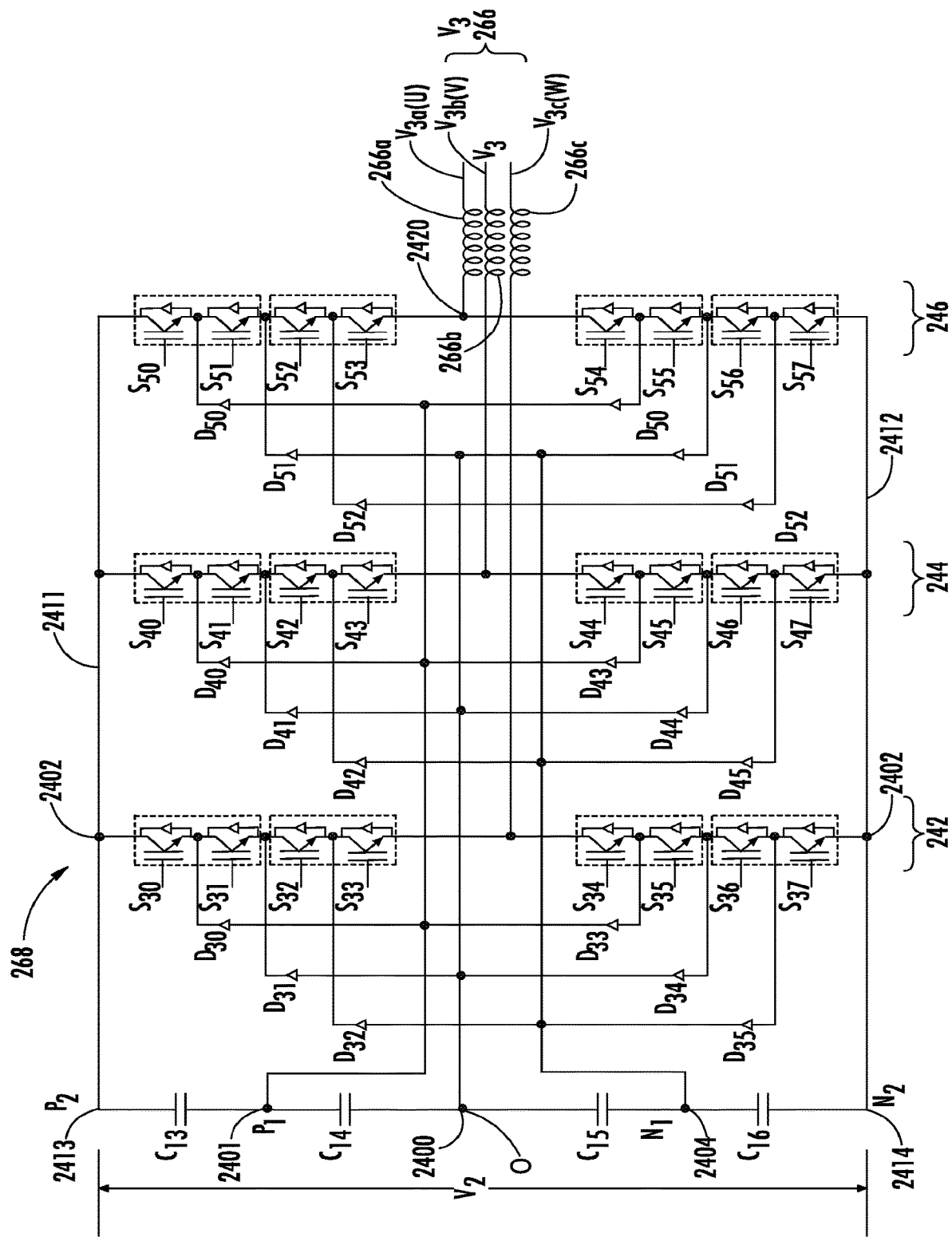
FIG. 6 is a circuit diagram of an embodiment of a five-level diode-clamped inverter of the DCSTATCOM of FIG. 3 or 4.

FIG. 6 shows inverter 268 which may be used to convert the DC voltage output V2 from the converter 262 to three-phase AC voltage V3. FIG. 6 shows a five-level diode-clamped inverter 268. The five-level inverter 268 includes three groupings of switches and diodes 242, 244, and 246 to generate the three phases V3a, V3b, and V3c of the AC voltage V3, which is the output voltage of the inverter 240. Each grouping of diodes D30-D35, D40-D45, and D50-D55 and corresponding switches S30-S37, S40-S47, and S50-S57 are connected together in a diode-clamped configuration.

Switches S30-S37, S40-547, and S50-S57 may be IGBTs. IGBTs allow for higher voltages/currents and higher switching frequencies. The five-level inverter 268 illustrated in FIG. 6 allows for sharing of the high voltage among the switches S30-S37, S40-S47, and S50-S57, and reduces harmonic distortion.

Switches S30-S37, S40-S47, and S50-S57 may be IGBTs. IGBTs allow for higher voltages/currents and higher switching frequencies. The five-level inverter 240 illustrated in FIG. 6 allows for sharing of the high voltage among the switches S30-S37, S40-S47, and S50-S57, and reduces harmonic distortion.

The switches S30-S37, S40-S47, and S50-S57 are controlled by a microprocessor (not shown) such as a digital signal processor (DSP) (not shown). The DSP may use a space vector pulse width modulation (SVPWM) technique for operating the switches S30-S37, S40-S47, and S50-S57 in such a way that the neutral-point voltage remains balanced in open-loop operation. The SVPWM technique is an inverter modulation technique for synthesizing a voltage space vector V* (described below with respect to FIG. 8) over a modulation sampling period $T_s$ (see FIG. 9 discussed below).

The SVPWM technique provides the advantages of superior harmonic quality and large under-modulation range that extends the modulation factor from 78.5% to 90.7%. Alternatively or in addition to the SVPWM, an artificial neural network (ANN) control technique can be used to reduce harmonics outputted from the inverter 268.

Figure 7:
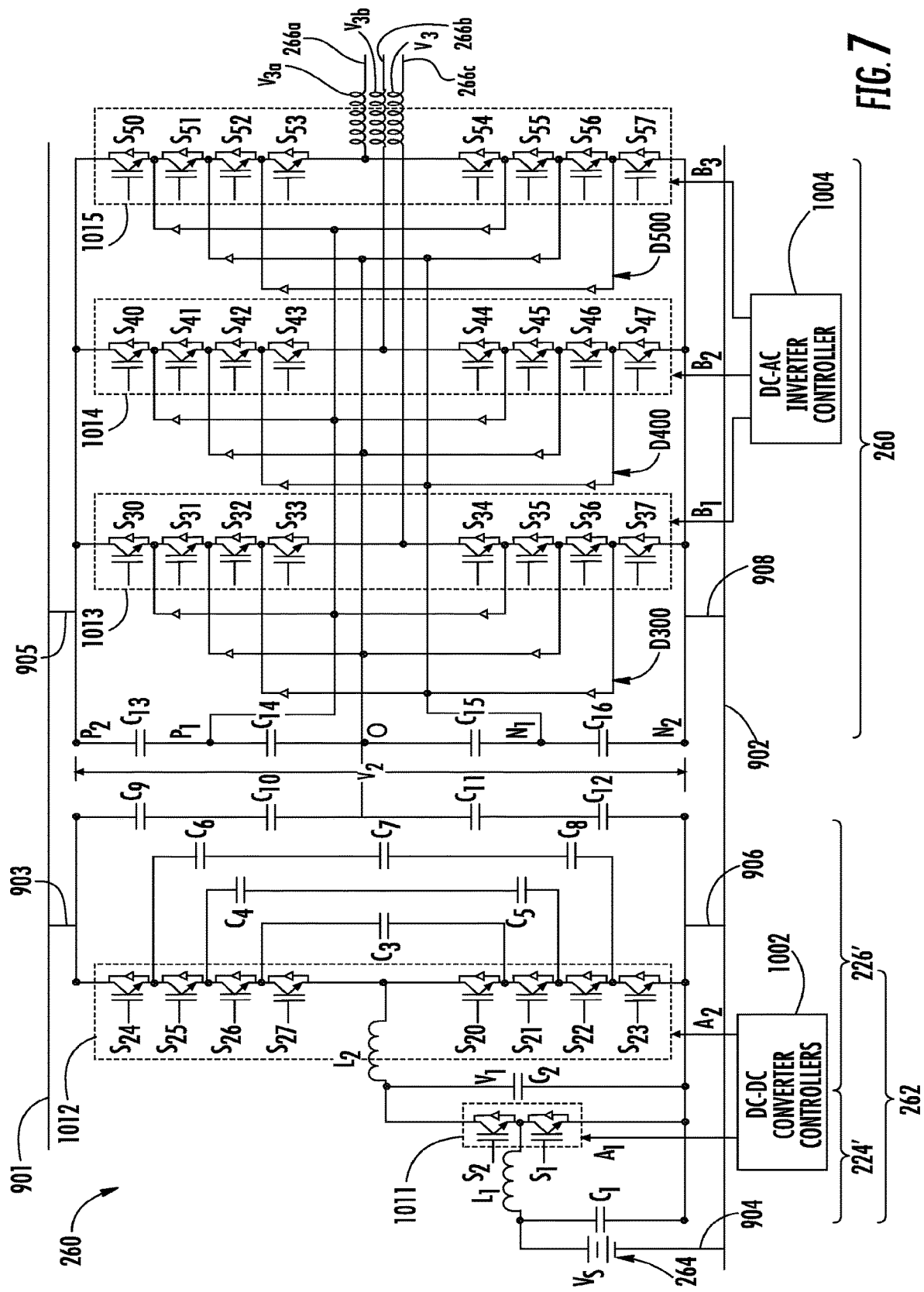
FIG. 7 is a circuit diagram of the multi-level two-stage bidirectional DC-DC converter of FIG. 5 coupled to the five-level diode-clamped inverter of FIG. 6.

FIG. 7 shows the combination of the converter 262 of FIG. 5 and the inverter of FIG. 6. The capacitors C9-C12 may be the same as capacitors C13-C16, respectively. Additionally, the converter/inverter combination includes smoothing reactors (266 a-c) at the output of the inverter.

Space vector pulse width modulation of three-level inverters with respect to neural networks is described in "A Neural-Network-Based Space-Vector PWM Controller for a Three-Level Voltage-Fed Inverter Induction Motor Drive", by Subrata K. Mondal, Joao O. P. Pinto and Bimal K. Bose, published in IEEE Transactions on Industry Applications, Vol. 38, No. 3, May/June 2002, Paper IPCSD 02-005, presented at the 2001 Industry Applications Society Annual Meeting, Chicago, Ill., September 30-October 5, 0093-9994 ©2002 IEEE, and in "Neural-Network-Based Space-Vector PWM of a Three-Level Inverter Covering Overmodulation Region and Performance Evaluation in Induction Motor Drive", by Cong Wang, Bimal K. Bose, Valentin Oleschuk, Subrata Mondal, and Joao O. P. Pinto, 0-7803-7906-3/03 ©2003 IEEE, the entire contents of both of which are hereby incorporated by reference herein.

Additionally, space vector pulse width modulation of three-level inverters is described in "Space Vector Pulse Width Modulation of Three-Level Inverter Extending Operation Into Overmodulation Region," by Subrata K. Mondal, Bimal K. Bose, Valentin Oleschuk and Joao O. P. Pinto, published in IEEE Transactions on Power Electronics, Vol. 18, No. 2, March 2003, 0885-8993 ©2003 IEEE, the entire contents of which is hereby incorporated by reference herein.

Figure 8:
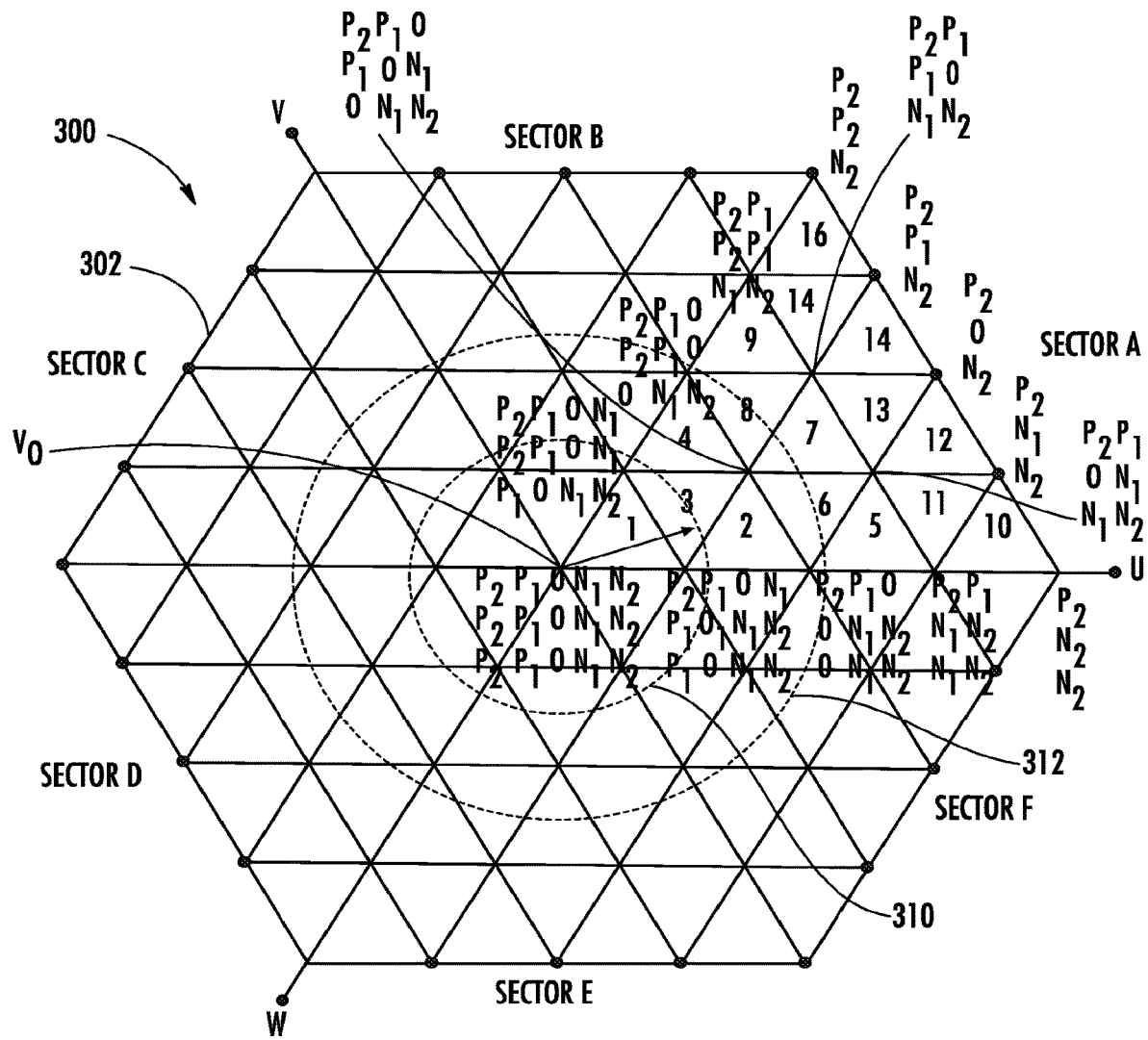
FIG. 8 is a space-vector modulation diagram showing switching states for Sector A of the 5-level inverter of FIG. 6.

FIG. 8 is a space-vector modulation diagram 300 showing switching states for Sector A of the five-level inverter 268 of FIG. 6 according to embodiments of the present disclosure.

Figure 9:
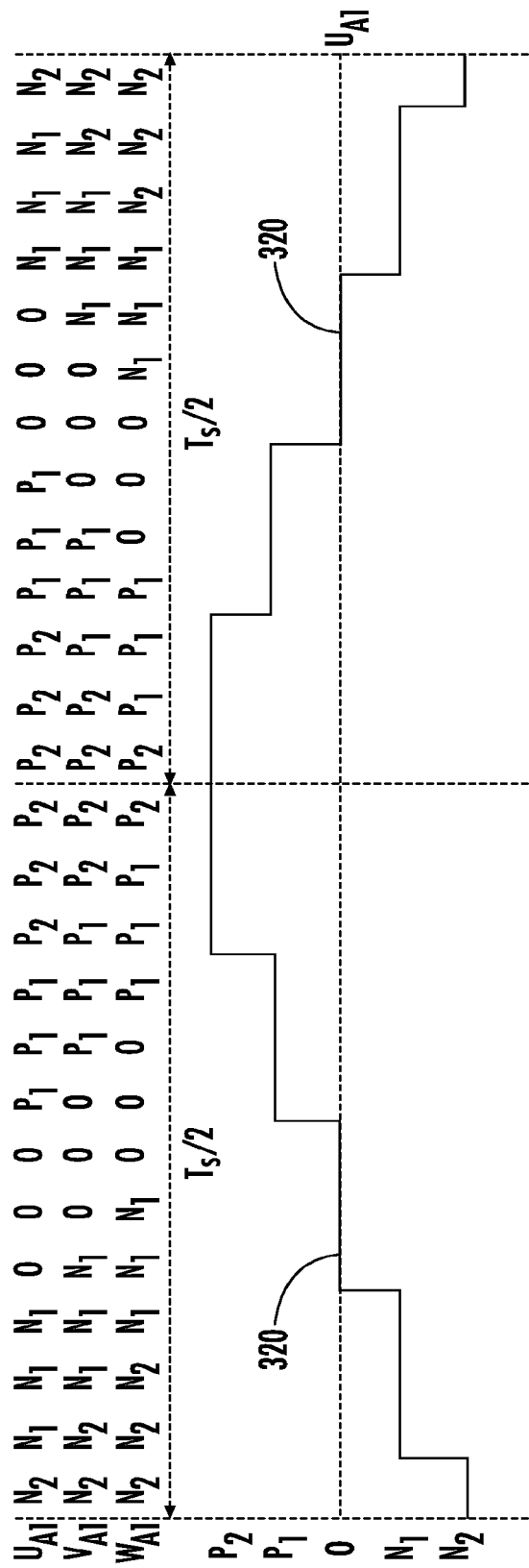
FIG. 9 shows the sequence of switching states and waveform of phase U for region 1 in Sector A ($U_{A1}$) of the space-vector modulation diagram of FIG. 8.

FIG. 9 shows the sequence of switching states of phase U for region 1 in Sector A ($U_{A1}$) of the space-vector modulation diagram 300 in FIG. 8. The switching states for the space-vector modulation diagram 300 are such that the sequence of switching causes balancing of the voltages across the capacitors C13, C14, C15, and C16 of the five-level inverter 240 of FIG. 6 in open loop operation.

Referring to FIGS. 8 and 9, space-vector modulation diagram 300 is formed by a hexagon 302. The hexagon 302 for the five-level design has six sectors, i.e., sectors A, B, C, D, E, and F, each of which has sixteen regions (1-16), giving altogether 96 regions of operations, i.e., 16 regions×6 sectors=96 regions of operations.

There are 125 switching states in five-level inverters, such as the five-level diode-clamped inverter 268 of FIG. 6. There are 120 active states and the remaining five states are zero states occurring at the center point $V_0$ of the diagram 300. U, V, and W (designated as V3a, V3b, and V3c, respectively, in FIG. 7) are the phases, and $P_2$, $P_1$, O, $N_1$, and $N_2$ are DC-bus points. The number of switching states is determined by raising the number of levels, e.g., five, to the power of the number of phases, e.g., three for phases U, V, and W. Therefore, the number of switching states is 125 ($5^3$). Since there are six sectors, i.e., Sectors A, B, C, D, E, and F, with 20 active states per sector, the total number of active states is 120 (6×20). The active states are those states extending beyond the center point $V_0$.

As described above, the SVPWM technique is an inverter modulation technique for synthesizing a voltage space vector V*. In FIG. 8, voltage space vector V* originates at the center point $V_0$. In the example shown, the voltage space vector V* is characterized by a constant voltage value represented by a first circle 310 so that the voltage space vector V* may rotate around the center point $V_0$. Therefore, all switching states at the circumference of the first circle 310 are at the same voltage V*. Similarly, if the voltage space vector V* is characterized by a constant voltage value represented by a second circle 312 that is concentric with first circle 310, the voltage space vector V* then assumes a constant voltage represented by the second circle 312.

In the example shown, since the second circle 312 has a radius that is greater than the radius of the first circle 310, the constant voltage represented by the second circle 312 is greater than the constant voltage represented by the first circle 310. Alternatively, if the second circle 312 were to have a radius that is less than the radius of the first circle 310, then the constant voltage represented by the second circle 312 would be less than the constant voltage represented by the first circle 310.

Table 2 below illustrates the switching states for switches SX0-SX7 of the inverter 260, where X is 3, 4, or 5. Operation of each set of switches SX0-SX7 of FIG. 7 produces a phase of the three-phase AC output. In Table 2, the closing of a switch is represented by the numeral "1" and the opening of a switch is represented by the numeral "0."

TABLE 2

(where X = 3, 4, or 5)

| | Switching State | | | | | | | |
|---|---|---|---|---|---|---|---|---|
| | SX0 | SX1 | SX2 | SX3 | SX4 | SX5 | SX6 | SX7 |
| P2 | 1 | 1 | 1 | 1 | 0 | 0 | 0 | 0 |
| P1 | 0 | 1 | 1 | 1 | 1 | 0 | 0 | 0 |
| O | 0 | 0 | 1 | 1 | 1 | 1 | 0 | 0 |

TABLE 2-continued (where X = 3, 4, or 5)

| | Switching State | | | | | | | |
|---|---|---|---|---|---|---|---|---|
| | SX0 | SX1 | SX2 | SX3 | SX4 | SX5 | SX6 | SX7 |
| N1 | 0 | 0 | 0 | 1 | 1 | 1 | 1 | 0 |
| N2 | 0 | 0 | 0 | 0 | 1 | 1 | 1 | 1 |

In FIG. 6, junction 2400 represents state O, which represents neutral point balancing so that the average current injected at O should be zero. Voltage V2 is measured at junction 2413 and 2414 located between capacitors C13 and C16. States P1 and P2 represent positive bus voltages. States N1 and N2 represent negative bus voltages.

State P1 is represented by a voltage at junction 2401 between capacitors C14 and C13. State P2 corresponds to a voltage at junction 2413 on common positive bus 2411 that electrically couples junction 2400, capacitor C14, junction 2401, and capacitor C13 to junction 2420 for phase V3a or U. Switches S30, S31, S32, and S33 are electrically coupled to common positive bus 2411 at junction 2402 via the collector side of switch S30. Similarly, state N1 corresponds to a voltage at junction 2401' between capacitors C15 and C16. State N2 corresponds to a voltage at junction 2414 on common negative bus 2412 that electrically couples junction 2400, capacitor C15, junction 2401', and capacitor C16 to junction 2420 for phase V3a or U. Switches S34, S35, S36, and S37 are electrically coupled to common negative bus 2412 at junction 2402' via the emitter side of switch S37.

Referring again to Table 2, in conjunction with FIG. 7, phase W (V3c in FIG. 7), for example, is in state P2 (positive bus voltage) when the switches S30, S31, S32, and S33 are closed or "ON", and switches S34, S35, S36, and S37 are open or "OFF". The phase W is in state P1 (positive bus voltage that is less than P2) when switches S30, S35, S36, and S37 are open or OFF, and switches S31, S32, S33, and S34 are closed or ON. The phase W is in state O when switches S30, S31, S36, and S37 are open or OFF and switches S32, S33, S34, and S35 are closed or ON.

The phase W is in state N1, which corresponds to a negative bus voltage that is greater than a negative bus voltage that corresponds to state N2, when switches S30, S31, S32, and S37 are turned off (i.e., open) and switches S33, S34, S35, and S36 are turned on (i.e., closed). The phase W is in state N2, which corresponds to a negative bus voltage that is less than the negative bus voltage that corresponds to state N1, when switches S30, S31, S32, and S33 are turned off (i.e., open) and switches S34, S35, S36, and S37 are turned on (i.e., closed).

In FIG. 9, the states P2, P1, O, N1, and N2, and waveform 320 are plotted versus a sampling period Ts or symmetrically over half a sampling period Ts/2 for the phase $U_A$ in Sector A. The top portion of FIG. 9 also shows the switching states P2, P1, O, N1, and N2 of all three phases UA, VA, and WA. The modulation strategy illustrated in FIG. 7 is a DSP-based SVPWM modulation strategy for a 5-level DCSTATCOM system, e.g., the 5-level inverter 268 of FIG. 6.

It should be noted that in addition to the space-vector pulse width modulation method, those skilled in the art will recognize and understand that, as described in the publications referenced above, artificial neural network (ANN) control may be applied for the modulation of the switching states of the 5-level inverter 268 of FIG. 6.

DCSTATCOM, without an output transformer, has a small footprint as it replaces the output transformer by a compact power electronic voltage converter. It significantly improves transient stability and regulates dynamic voltage at PCC (Point of common coupling). It also regulates both lag and lead reactive power. Therefore, DCSTATCOM provides stable voltage for a weak grid along with continuous reactive power regulation.

DCSTATCOM can also be controlled to manage active power. DCSTATCOM acts as active power sources like UPS if a DC energy source is available at the input of the DCSTATCOM inverter. So, UPS is not needed in the data center if DCSTATCOM is connected at the input supply of the data center, which significantly reduces CAPEX cost of the data center. In embodiments, batteries and ultra-capacitors may be used as energy sources to supply active power. Also, in embodiments, the generator may be taken out from the data center design if on-site distributed power like solar, fuel cells, wind, etc. is available to be used as back-up power. This also reduces CAPEX costs of a proposed data center.

Available battery voltage of energy storage is a low value (approximately 700 to 1000 V DC). So two stages of DC-DC boost converters are needed to boost voltage efficiently as shown in FIG. 5. A multi-level inverter is needed at the output of the two stages of the DC-DC boost converters to generate 13.8 KV AC directly without any step-up transformer as shown in FIG. 6. Therefore, the overall footprint of the proposed DCSTATCOM without an output transformer would be a smaller footprint, as shown in FIG. 7.

The DCSTATCOM at the input supply of the data center takes out significant CAPEX costs from the data center as the DCSTATCOM is considered to be part of the utility side. The DCSTATCOM of the present disclosure improves voltage stability of both grid and on-site distributed sources at PCC near the data center. It also improves overall PF of the data center with a reactive component load.

In comparison to traditional STATCOM, which compensates for reactive power, DCSTATCOM compensates for both active and reactive power. DCSTATCOM needs a smaller capacitor with respect to traditional STATCOM to smooth battery current due to the integration of battery and capacitor in parallel mode. Depending on the data center back-up time requirement, a number of battery cells can be connected in parallel.

Figure 10:
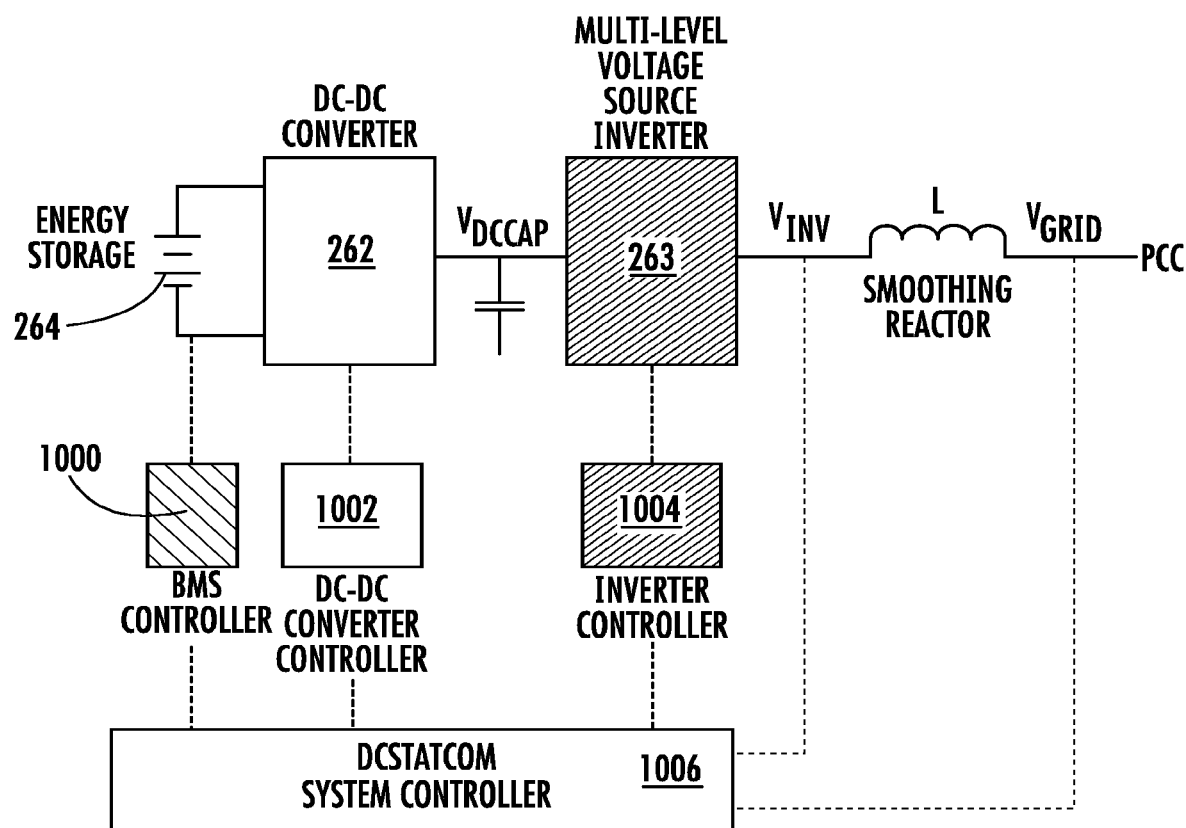
FIG. 10 is a block diagram of an overall control system of DCSTATCOM.

FIG. 10 is a block diagram of the overall DCSTATCOM control system including the DCSTATCOM system controller 1006 and three main sub-system controllers: the Battery Management System (BMS) controller 1000, the DC-DC converter controller 1002, and the inverter controller 1004. Charging and discharging of the battery 264, which may alternatively be an ultracapacitor or a combination a battery and an ultracapacitor, is controlled by BMS controller 1000 based on cell temperature and State of Charge (SOC) conditions of the battery 264 and availability of power at PCC. In embodiments, if the temperature of one or more cells of the energy storage device exceeds a predetermined threshold, the BMS controller 1000 may determine that the energy storage device cannot be charged.

DC-DC converter 262 is controlled by DC-DC converter controller 1002. An example embodiment of the DC-DC converter 262 is illustrated in FIG. 5. The multi-level inverter 268 is controlled by inverter controller 1004. An example embodiment of the multi-level voltage source inverter 268 is illustrated in FIG. 7. An example embodiment of a control methodology implemented by the inverter controller 1004 is illustrated in FIGS. 8 and 9.

The three sub-system controllers 1000, 1002, and 1004 are controlled by the DCSTATCOM system controller 1006. The DCSTATCOM system controller 1006 communicates with the grid and receives grid voltage and current information. The DCSTATCOM system controller 1006 also communicates with other energy sources, e.g., a solar energy source, connected at PCC using SCADA of the Smart Grid controller to decide control function at any particular instant.

DCSTATCOM has dual independent simultaneous control capability of both active and reactive power due to the integration of a battery storage system with traditional STATCOM. The following equations indicate that $\partial$ (the angle between $V_{GRID}$ and $V_{INV}$) and $V_{INV}$ can be controlled to control active (P) and reactive (Q) power of DCSTATCOM respectively:

$$P=3*V_{GRID}*V_{INV}*\sin \partial/\omega*L, \text{ and}$$

$$Q=3*V_{GRID}*(V_{INV}-V_{GRID})/\omega*L,$$

where $V_{GRID}$=grid/utility voltage, $V_{INV}$=inverter voltage, $\omega$=line frequency, and L=smoothing reactor.

Due to implementation of fast power electronics, IGBT-based devices, the controller has the ability to effect changes (+Q capacitive VAR compensation to −Q inductive VAR compensation) within a quarter of a cycle. By controlling output voltage DCSTATCOM ($V_{INV}$) magnitude higher or lower than the PCC grid system voltage ($V_{GRID}$), the system is able to regulate line voltage by absorbing or generating VAR. The ability of operation of DCSTATCOM with energy storage in four quadrant operation (both reactive plus active power operation) benefits/reduces data center CAPEX and OPEX costs.

Flow of reactive power can be controlled by adjusting the inverter voltage ($V_{INV}$). The following conditions happen:
1. Inverter of DCSTATCOM acts as a generator of reactive power (Q>0) when 'Magnitude of $V_{INV}$' is greater (>) than 'Magnitude of $V_{GRID}$'. The grid sees DCSTATCOM as a capacitance connected to its terminals, i.e. DCSTATCOM is seen to provide capacitive VARS to the system.
2. Inverter of DCSTATCOM acts as an absorber of reactive power (Q<0) when 'Magnitude of $V_{INV}$' is less (<) than 'Magnitude of $V_{GRID}$'. The grid sees DCSTATCOM as an inductance connected to its terminals.
3. Reactive power exchange is zero (Q=0) when $|V_{INV}|=|V_{GRID}|$.

The amount of reactive power depends on the magnitude of the voltage $V_{INV}$ and on the drop across smoothing reactor L. The fundamental component of the voltage $V_{INV}$ is controlled by varying the DC capacitor voltage ($V_{DCCAP}$). The inverter voltage of DCSATCOM ($V_{INV}$) is normally kept in phase (i.e., $\partial$=0) with the grid voltage ($V_{GRID}$), but the voltage angle is temporarily phase shifted in order to vary the $V_{DCCAP}$.

Flow of active power can be controlled by adjusting the phase angle ($\partial$) of the inverter voltage of DCSTATCOM ($V_{INV}$) and grid voltage ($V_{GRID}$). The following conditions happen:
1. DCSTATCOM absorbs real power (P<0) from Grid and battery is charged (rectification mode) if $V_{INV}$ lags $V_{GRID}$ by angle $\partial$.
2. DCSTATCOM supplies real power (P>0) to grid and data center and battery is discharged (inversion mode) if $V_{INV}$ leads $V_{GRID}$ by angle $\partial$.

FIG. 14 shows the various operating conditions of DCSTATCOM.

The active and reactive power control may be implemented by a digital signal processor (DSP) or other suitable processor of the DCSTATCOM system controller 1006 of FIG. 10.

Figure 11:
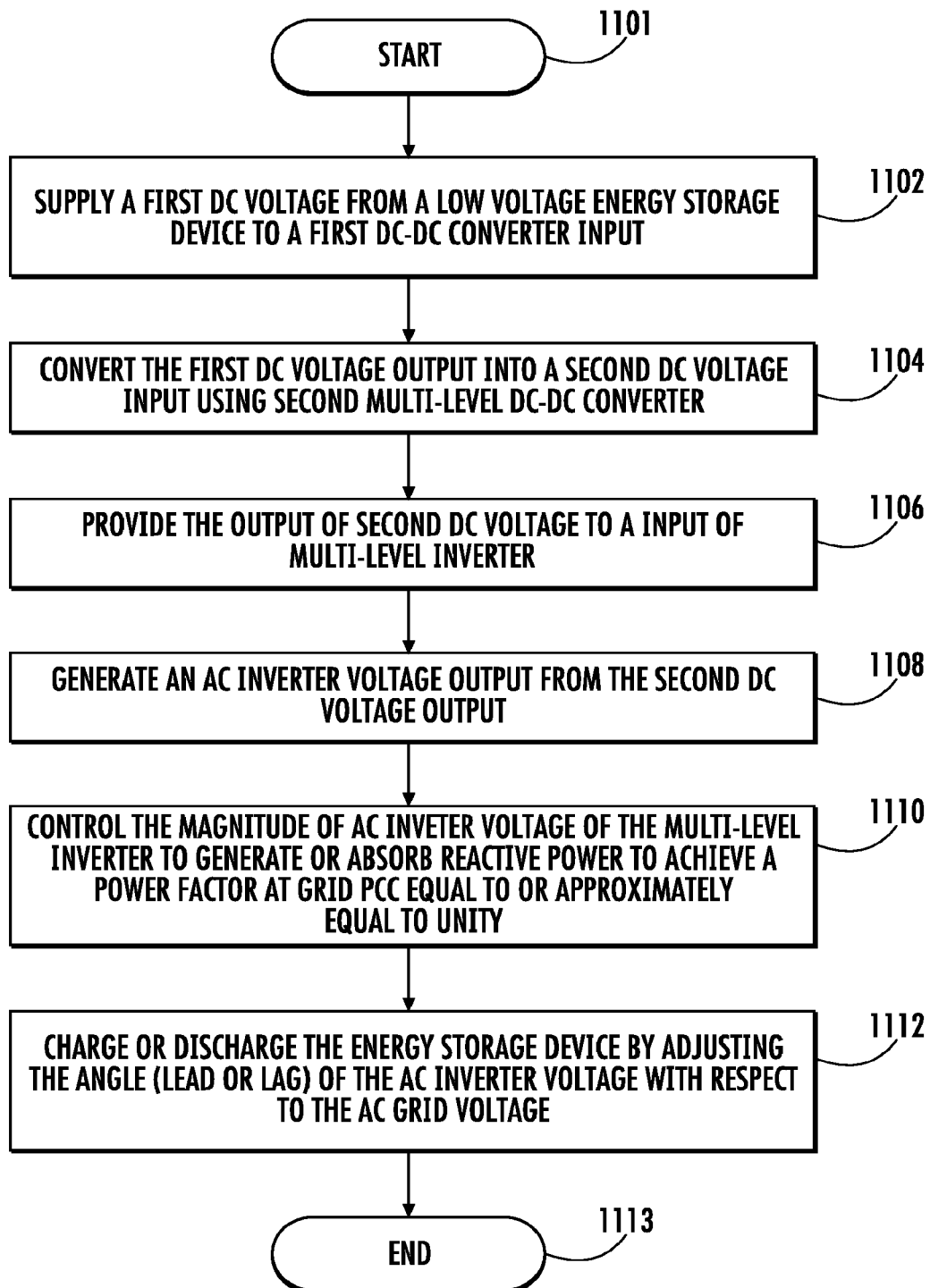
FIGS. 11-13 are flowcharts illustrating methods for controlling the flow of power between a transformerless DCSTATCOM and an electrical load.

FIG. 11 is a flowchart of a method for exchanging power between a transformerless DCSTATCOM and an electrical load. After starting in step 1101, a first DC voltage is supplied from a low voltage energy storage device to a DC-DC converter in step 1102. In step 1104, the first DC voltage is converted into a second DC voltage and, in step 1106, the second DC voltage is provided to a multi-level inverter. In step 1108, an AC inverter voltage is generated from the second DC voltage. The AC inverter voltage is a medium voltage less than the second DC voltage. In step 1110, the AC inverter voltage of the multi-level inverter is controlled to generate or absorb reactive power to achieve a power factor at PCC equal to or approximately equal to unity. Before ending in step 1113, the energy storage device is charged or discharged by adjusting the phase angle of the AC inverter voltage with respect to the AC grid voltage.

Figure 12:
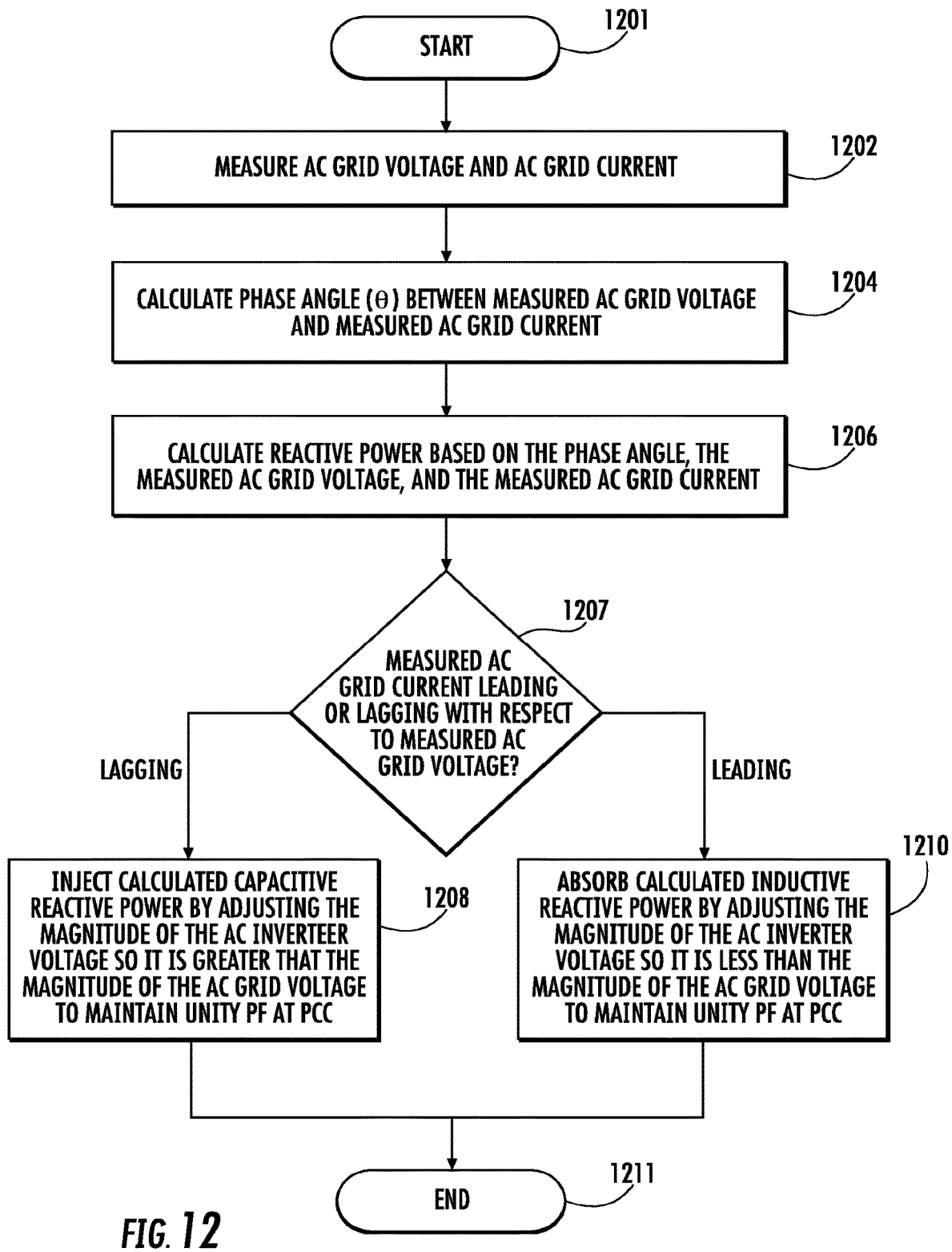

FIG. 12 is a flowchart of a method for compensating for reactive power according to embodiments of the present disclosure. After starting in step 1201, the AC grid voltage and the AC grid current are measured in step 1202. In step 1204, a phase angle (Θ) between the measured AC grid voltage and the measured AC grid current is calculated. In step 1206, reactive power is calculated based on the phase angle, the measured AC grid voltage, and the measured AC grid current. In step 1207, it is determined whether the measured AC grid current is leading or lagging with respect to the measured AC grid voltage.

If it is determined that the measured AC grid current is leading with respect to the measured AC grid voltage, the calculated reactive power is generated by adjusting the magnitude of the AC inverter voltage so it is greater than the magnitude of the AC grid voltage in step 1208. If it is determined that the measured AC grid current is leading with respect to the measured AC grid voltage, the calculated reactive power is absorbed by adjusting the magnitude of the AC inverter voltage so it is less than the magnitude of the AC grid voltage in step 1210. Then, the method ends in step 1211.

Figure 13:
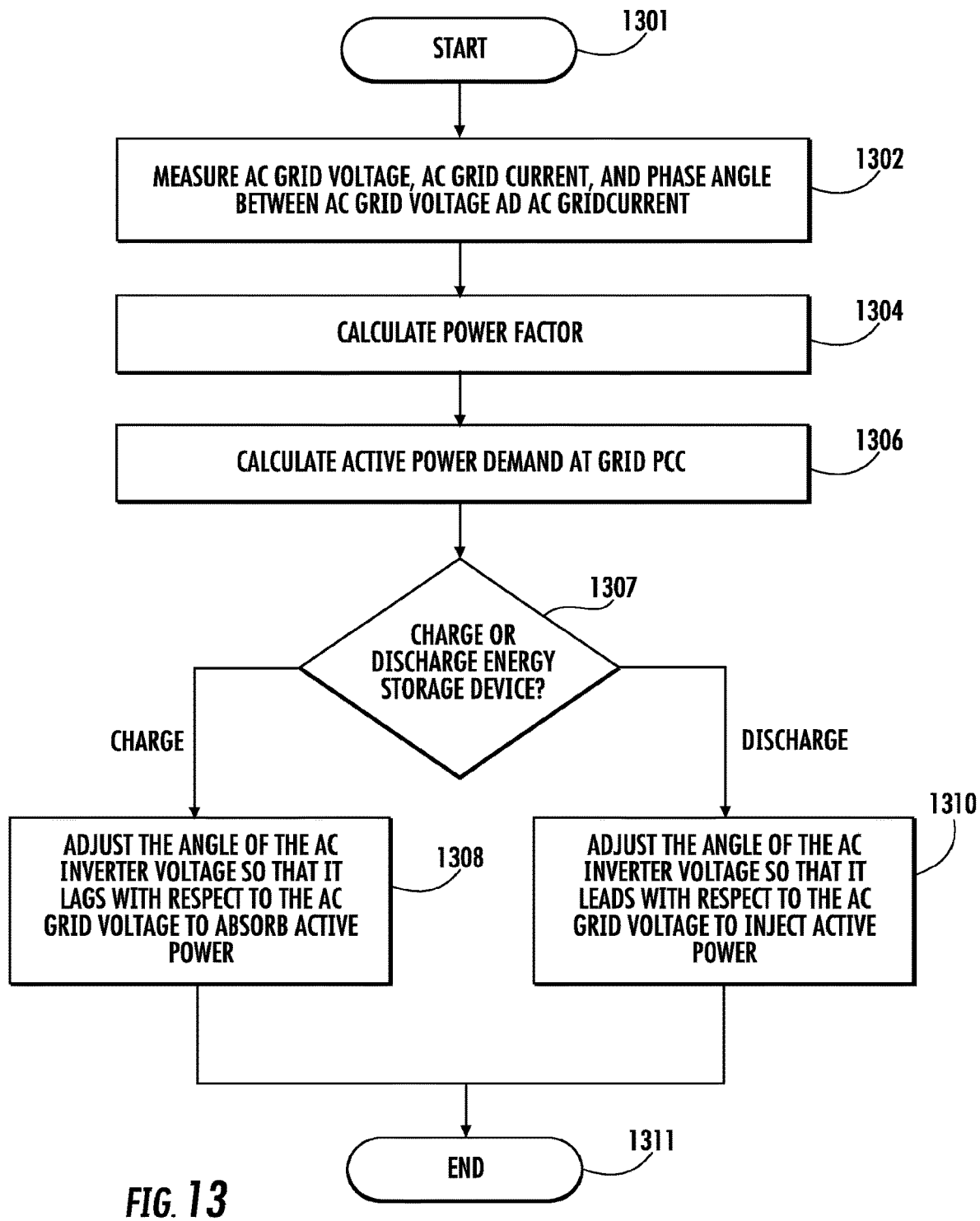

FIG. 13 is a flowchart of a method for charging and discharging an energy storage device according to embodiments of the present disclosure. After starting in step 1301, the AC grid voltage, the AC grid current, and the phase angle between the AC grid voltage and the AC grid current is measured in step 1302. In step 1304, the power factor is calculated based on the measured phase angle. In step 1306, the active power demand at the grid PCC is calculated based on the measured AC grid voltage, the measured AC grid current, and the calculated power factor. Then, in step 1307, it is determined whether to charge or discharge the energy storage device based on the calculated active power demand.

If it is determined that the energy storage device should be charged, the angle of the AC inverter voltage is adjusted so that it lags with respect to the AC grid voltage in step 1308. If it is determined that the energy storage device should be charged, the AC inverter voltage is adjusted so that it leads with respect to the AC grid voltage in step 1310. Then, in step 1311, the method ends.

The methods according to the present disclosure may be performed by any combination of the DCSTATCOM system controller 1006, the Battery Management System (BMS) controller 1000, the DC-DC converter controller 1002, and the inverter controller 1004. One or more of these controllers may include sensors for measuring voltage, current, phase angle, etc., a suitable processor and memory for performing calculations and other functions based on these measurements, and any other hardware, firmware, and/or software components necessary for carrying out the method steps of the present disclosure.

FIG. 15 shows cost savings per year and corresponding freeing up data center capacity for four different cases: (1) at 0.85 PF, (2) at unity PF with existing reactive power STATCOM, (3) at unity PF with DCSTATCOM at upstream of data center, and (4) at unity PF with DCSTATCOM at downstream of data center). It is assumed that IT load is 1 MW and PUE is 1.5.

In one example, DCSTATCOM, which includes both STATCOM and UPS functions, not only may save the above demand penalty of $16,733.10 per year, but also may reduce data center energy cost of $78,840/year for a 1 MW IT load at 1.5 PUE due to the elimination of MVUPS loss and cable copper loss (5%) (1.5 PUE×1000 kW×0.05 (losses)×24 hours×365 days×$0.12=$78,840/year). DCSTATCOM may also free up 19.25% of data center capacity (e.g., Transfer switch, Static Transfer Switch, Generator) if it is placed downstream (after Static Transfer Switch) from the data center source.

DCSTATCOM integrates multiple functions (like STATCOM VAR compensator, active power support, active filtering, voltage/frequency support, power quality/reliability) into one system controller. DCSTATCOM leverages the same capital investment ($/kW of DCSTATCOM and MVUPS are in same range) and generates better cost-benefit ratio. DCSTATCOM also eliminates UPS requirements in data centers and, in turn, reduces CAPEX of data centers. DCSTATCOM integrates grid and data center functionality into one solution.

While several embodiments of the disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A transformerless static synchronous compensator for an electrical load, comprising:
   an energy storage device;
   a two-stage bi-directional direct current (DC)-DC converter coupled to the energy storage device, wherein when the energy storage device is discharged, the stages of the two-stage bi-directional DC-DC converter operate to step up a voltage in two steps, and when the energy storage device is charged, the stages of the two-stage bi-directional DC-DC converter operate to step down the voltage in two steps;
   a multi-level inverter that outputs a medium alternating current (AC) inverter voltage, the multi-level inverter coupled to the two-stage bi-directional DC-DC converter and a point of common coupling (PCC); and
   a controller configured to control a magnitude of the medium AC inverter voltage of the multi-level inverter to generate or absorb reactive power to achieve a power factor equal to or approximately equal to unity at the PCC.

2. The transformerless static synchronous compensator according to claim 1, wherein the medium AC voltage is between about 3.3 kV and about 18 kV.

3. The transformerless static synchronous compensator according to claim 1, wherein the two-stage bi-directional DC-DC converter includes a first stage that generates a first output DC voltage and a second stage that generates a second output DC voltage higher than the first output DC voltage.

4. The transformerless static synchronous compensator according to claim 3, wherein a positive terminal of the second stage of the two-stage bi-directional DC-DC converter and a positive terminal of the multi-level inverter are electrically coupled to a common positive bus.

5. The transformerless static synchronous compensator according to claim 3, wherein the first stage includes two levels and the second stage includes more than two levels.

6. The transformerless static synchronous compensator according to claim 5, wherein the second stage includes three levels or five levels.

7. The transformerless static synchronous compensator according to claim 5, wherein the two-stage bi-directional DC-DC converter includes a plurality of switches that form the levels of the first and second stages and a plurality of capacitors coupled together in a flying capacitor topology having a common negative bus.

8. The transformerless static synchronous compensator according to claim 5, wherein the medium AC output is a three-phase AC output,
wherein the multi-level inverter includes three sets of switches, each of which corresponds to one of the three phases of the three-phase AC output, and
wherein each set of switches is configured in a diode-clamped multi-level topology.

9. The transformerless static synchronous compensator according to claim 3, wherein the multi-level inverter converts the second output DC voltage into a third output voltage that is an AC voltage smaller than the second output DC voltage.

10. The transformerless static synchronous compensator according to claim 3, further comprising a DC-DC converter controller configured to control the first stage with pulse width modulation control signals and configured to control the second stage in a flying mode configuration with fixed duty cycle control signals,
wherein the controller is further configured to control the multi-level inverter using space vector PWM control signals so as to perform neutral point voltage balancing.

11. The transformerless static synchronous compensator according to claim 1, wherein the two-stage bi-directional DC-DC converter is a bidirectional converter configured to allow a flow of both active and reactive power in a first direction from the energy storage device to an AC output of the multi-level inverter and in a second direction from the AC output of the multi-level inverter to the energy storage device.

12. The transformerless static synchronous compensator according to claim 1, wherein the energy storage device is a low voltage energy storage device.

13. The transformerless static synchronous compensator according to claim 12, wherein the low voltage is between about 700 V and about 1200 V.

14. The transformerless static synchronous compensator according to claim 1, wherein the energy storage device is a battery, an ultra-capacitor, or a battery and an ultra-capacitor electrically coupled to one another.

15. The transformerless static synchronous compensator according to claim 1, wherein the multi-level inverter includes more than two levels.

16. A method for supplying power from a transformerless static synchronous compensator to an electrical load when an interruption in power occurs, the method comprising:
supplying a first direct current (DC) voltage from a low voltage energy storage device to a two-stage bi-directional DC-DC converter;
converting, by the two-stage bi-directional DC-DC converter, the first DC voltage from the low voltage energy storage device into a second DC voltage;
generating, by a multi-level inverter, an alternating current (AC) inverter voltage from the second DC voltage, wherein the AC inverter voltage is a medium voltage less than the second DC voltage;
providing the AC inverter voltage to a point of common coupling (PCC); and
controlling the AC inverter voltage of the multi-level inverter to generate or absorb reactive power to achieve a power factor at the PCC equal to or approximately equal to unity,
wherein when the energy storage device is discharged, the stages of the two-stage DC-DC converter operate to step up a voltage in two steps, and when the energy storage device is charged, the stages of the two-stage DC-DC converter operate to step down the voltage in two steps.

17. The method according to claim 16, further comprising:
measuring an AC grid voltage and an AC grid current;
calculating a phase angle ($\Theta$) between the measured AC grid voltage and the measured AC grid current;
calculating reactive power based on the phase angle, the measured AC grid voltage, and the measured AC grid current;
determining whether the measured AC grid current is leading or lagging with respect to the measured AC grid voltage;
if the measured AC grid current is leading with respect to the measured AC grid voltage, generating the calculated reactive power by adjusting a magnitude of the AC inverter voltage so it is greater than the magnitude of the AC grid voltage; and
if the measured AC grid current is leading with respect to the measured AC grid voltage, absorbing the calculated reactive power by adjusting the magnitude of the AC inverter voltage so it is less than the magnitude of the AC grid voltage.

18. The method according to claim 16, further comprising:
measuring AC grid voltage, AC grid current, and phase angle between the AC grid voltage and the AC grid current;
calculating power factor based on measured phase angle;
calculating active power demand at grid PCC based on the measured AC grid voltage, the measured AC grid current, and the calculated power factor;
determining whether to charge or discharge the energy storage device based on the calculated active power demand at the grid PCC;
charging the energy storage device by adjusting the angle of the AC inverter voltage so that it lags with respect to the AC grid voltage; and
discharging the energy storage device by adjusting the angle of the AC inverter voltage so that it leads with respect to the AC grid voltage.

* * * * *